June 29, 1965 D. A. GOLDMAN ETAL 3,192,513

DATA PROCESSING AND DISPLAY SYSTEM

Filed Sept. 22, 1960 16 Sheets-Sheet 1

June 29, 1965 D. A. GOLDMAN ETAL 3,192,513

DATA PROCESSING AND DISPLAY SYSTEM

Filed Sept. 22, 1960 16 Sheets-Sheet 7

DATA PROCESSING AND DISPLAY SYSTEM

Filed Sept. 22, 1960 16 Sheets-Sheet 8

June 29, 1965 D. A. GOLDMAN ETAL 3,192,513

DATA PROCESSING AND DISPLAY SYSTEM

Filed Sept. 22, 1960 16 Sheets-Sheet 9

DATA PROCESSING AND DISPLAY SYSTEM

Filed Sept. 22, 1960 16 Sheets-Sheet 10

June 29, 1965 D. A. GOLDMAN ETAL 3,192,513

DATA PROCESSING AND DISPLAY SYSTEM

Filed Sept. 22, 1960 16 Sheets-Sheet 13

DATA PROCESSING AND DISPLAY SYSTEM

Filed Sept. 22, 1960

United States Patent Office 3,192,513

Patented June 29, 1965

3,192,513

DATA PROCESSING AND DISPLAY SYSTEM

David A. Goldman, Yorktown Heights, John W. Gray and Arthur F. Hayek, Pleasantville, and Ernest Morger, Bedford Village, N.Y., assignors to General Precision, Inc., a corporation of Delaware Filed Sept. 22, 1960, Ser. No. 57,776
8 Claims. (Cl. 340—174.1)

This invention relates to data processing and display systems and more particularly to data processing and display systems in which the data are displayed in printed form so as to provide a permanent written record of the displayed data.

For illustration purposes only the invention will be described and shown as applied to an air traffic control system. It is capable of use in numerous other applications such as logistics, ware housing, other forms of traffic control such as material, personnel and vehicular, and in other areas where the display of locations, quantities or any other information relative to objects, entities or other things, especially of a variable nature, is required.

At the present time and for some years past the aviation traffic control facilities in the United States have been inadequate to meet the requirements of its users. This inadequacy has resulted in short delays even under favorable and near favorable weather conditions with extended delays occurring under instrument weather conditions. Aside from the economic loss and inconveniences resulting from these delays numerous midair collisions with a resultant loss of life and property have occurred. Many of these collisions might possibly have been averted if the air traffic control system provided sufficient capacity and speed for servicing a larger percentage of the number of aircraft aloft.

This problem has been intensified recently with the introduction of high performance turbo-prop and jet aircraft and the incidence of delays and the likelihood of additional midair collisions will increase many fold as each year passes due to the normal growth of air traffic which may be predicted by extrapolating the growth in air traffic during the past decade. Furthermore, the high performance aircraft recently introduced must be free of unnecessary or prolonged delays in order to operate efficiently and fulfill the needs they were designed to fulfill.

The solution of this problem requires a data processing and display system which keeps pace with the constantly and rapidly changing traffic picture presented by today's high performance aircraft and which will at the same time provide a clear and distinguishable picture of the air traffic in a given locality at a glance. The system must at the same time provide a permanent written record of every aircraft movement and of every ordered change in aircraft movement so that the present and future location of each and every controlled flight is accurately known to permit the detection of potential conflicts so that affirmative action may be taken to avoid same.

The system selected for accomplishing the above broad objectives divides the airspace into routes and assigns fixed points along these routes at which an aircraft must report. These points, referred to as fix points, are spaced along the various routes, and for each flight, a strip is prepared for each and every fix point that flight will pass through. The flight strips which are usually prepared in advance set forth the following information:

(1) Fix point covered
(2) Aircraft identity
(3) Filed air speed and aircraft type
(4) Previous fix point
(5) Previous fix point time of departure if available (6) Estimated time of arrival over covered fix point if available
(7) Filed altitude routes and terminal.

Space is provided on each of the strips to update the information at any time that conditions change due to either planned or unplanned changes.

A strip similar to that described above is prepared for each and every fix point of each and every controlled flight. The prepared strips are assembled on holders which are placed on a console so that each strip is in full view of a sector controller who is required to resolve conflicts between flights based on the information which is automatically displayed on the strips. Printing of update information is accomplished by automatic printing mechanisms contained within the console. Data to be printed are supplied to the console in digital form by a computer after appropriate processing.

One object of the invention is to provide an automatic data processing and display system which is inexpensive to manufacture and which maintains speed, accuracy and dependability, and operates quietly.

Another object of this invention is to provide a data processing and display system which accepts and records in permanent form random information on a preselected medium which is randomly located.

Yet another object of the invention is to provide a data processing and display system which is both small in size and light in weight and requires no memory or permanent storage device.

Another object of the invention is to provide a novel scanning system suitable for use in data processing and display systems.

A further object of the invention is to provide a novel remote controlled printing mechanism which provides versatility and the ability to cover many printing positions with simplified or limited code.

Another object of this invention is to provide a data processing and display system which may be manually operated in the event of failure and which will retain in printed form all of the information which has been processed up to the time of failure.

The invention contemplates a data processing and display system comprising media for recording information each mounted on a differently coded holder, a source of information-bearing signals including the code of one of said holders, means for scanning the holder codes and comparing the scanned codes with the holder code contained in the information bearing signals, and means for recording the remaining portion of the information-bearing signals on that medium which is mounted on the holder having the code which compares successfully with the holder code with the information-bearing signals.

The foregoing and other objects and advantages of the invention will appear more clearly from a consideration of the specification and drawings wherein one embodiment of the invention is described and shown in detail for illustration purposes only.

Figure 5C:
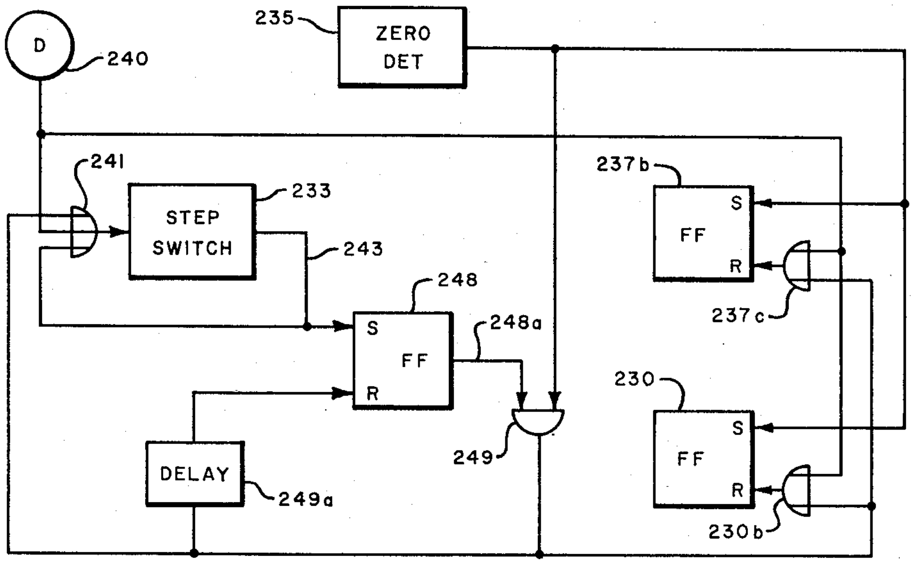
Figure 5A:
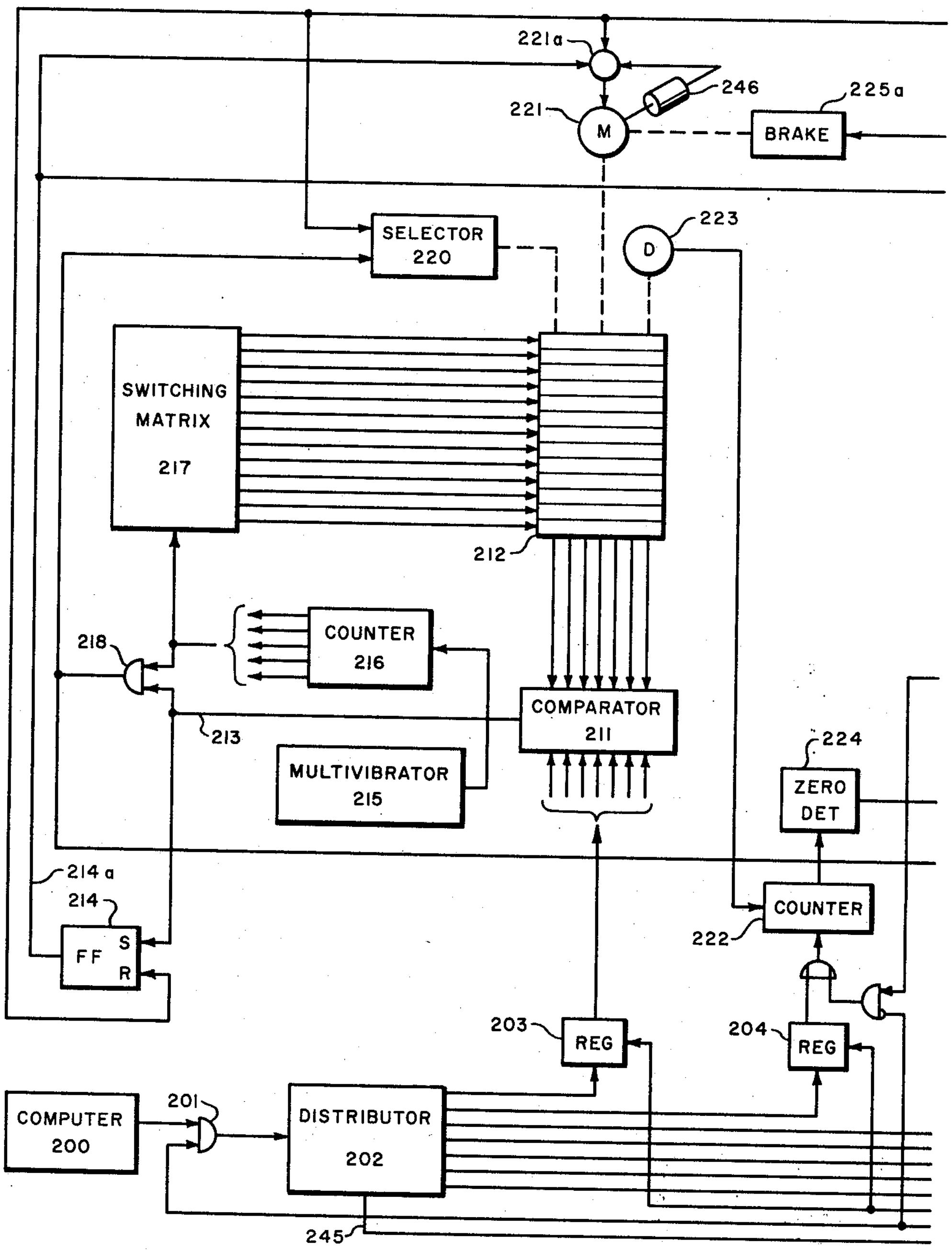
Figure 5B:
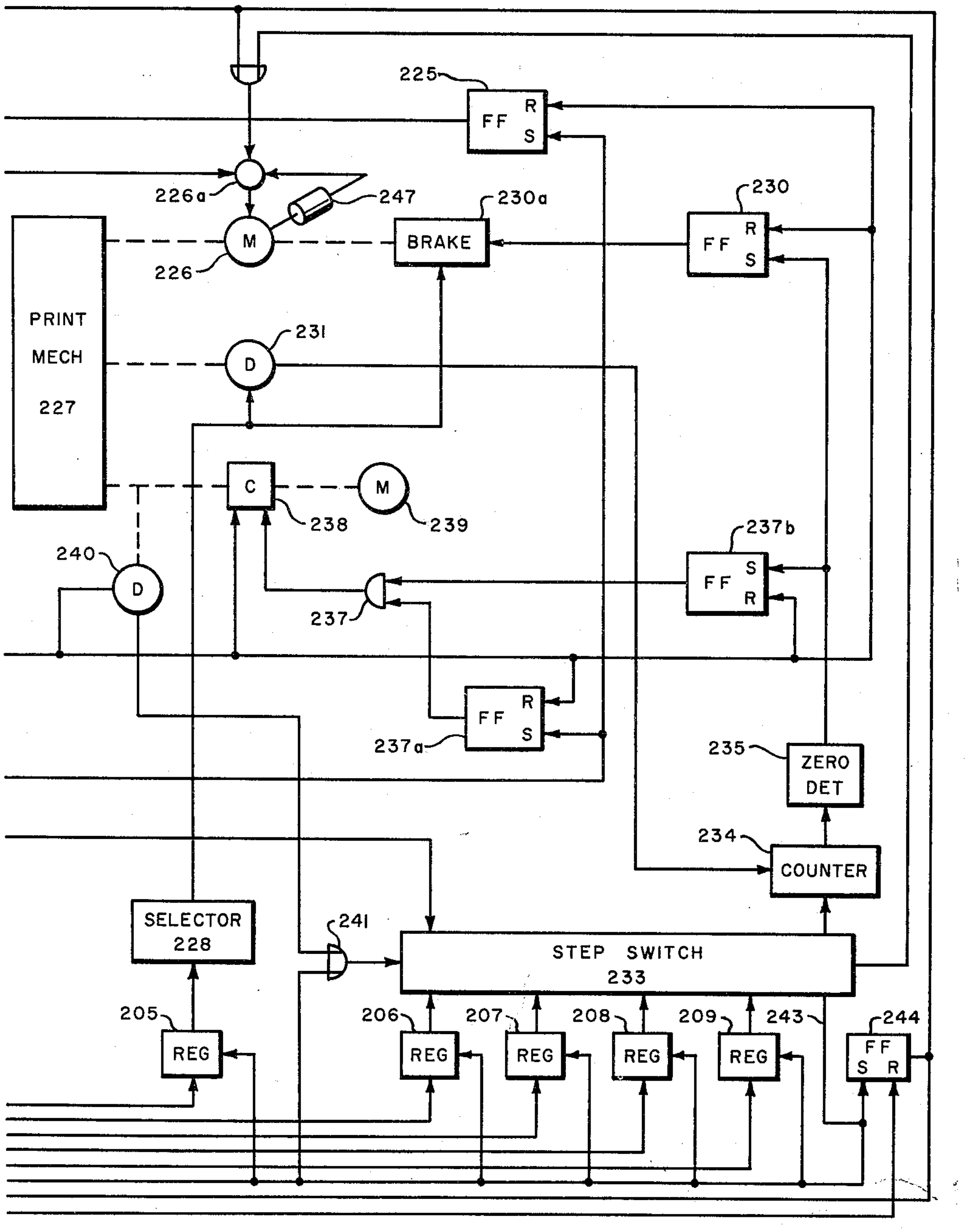
Figure 6:
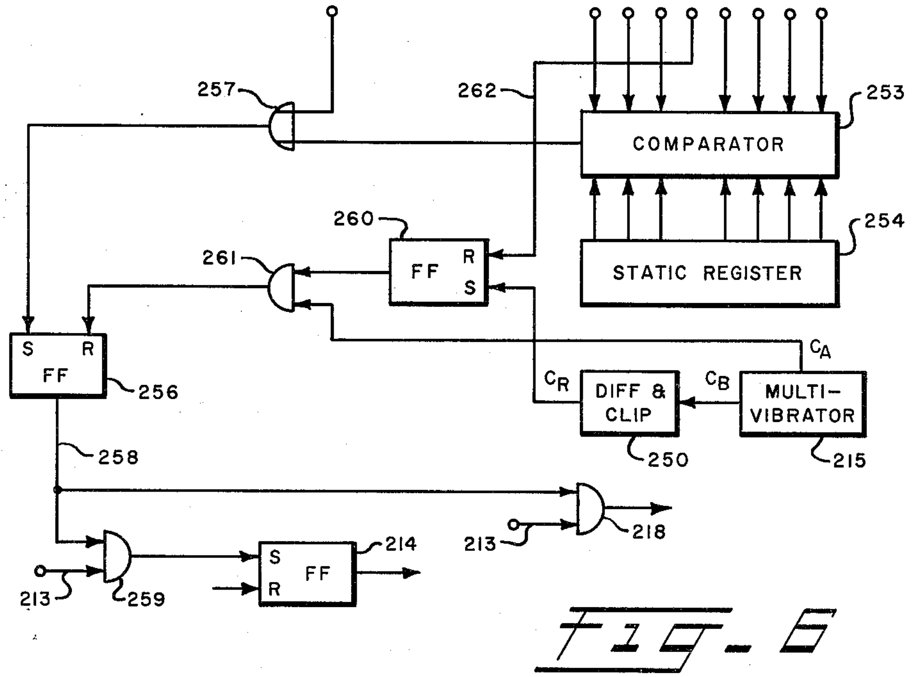
Figure 7:
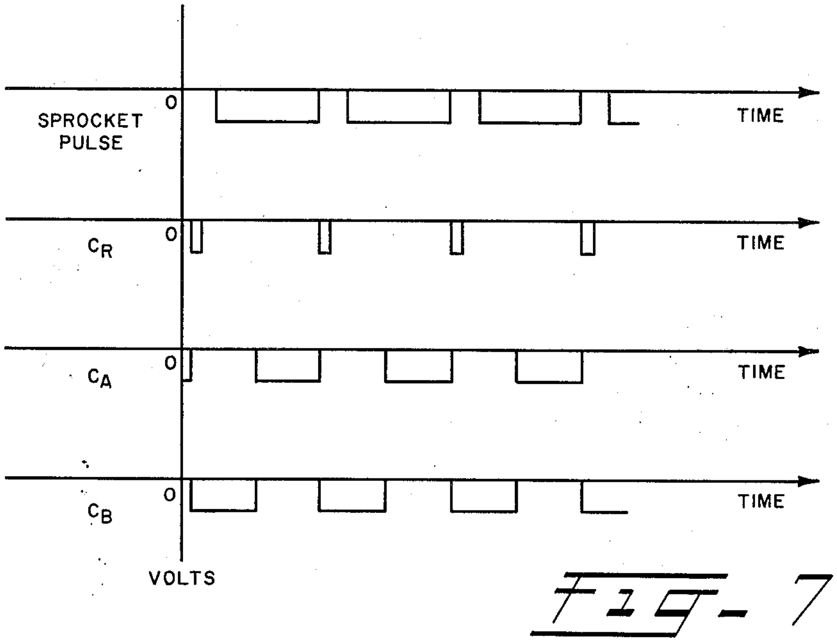
Figure 8:
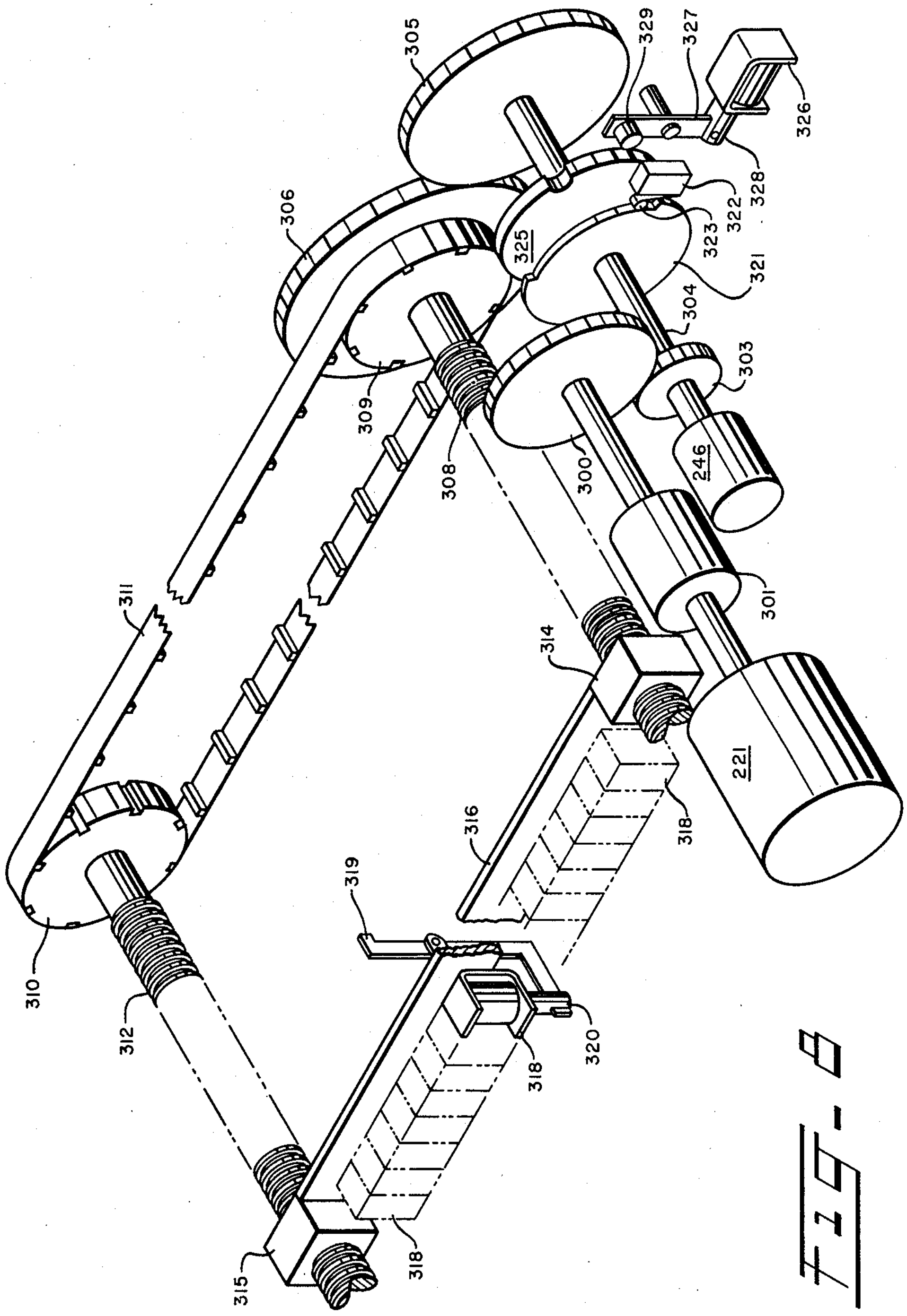
Figure 9:
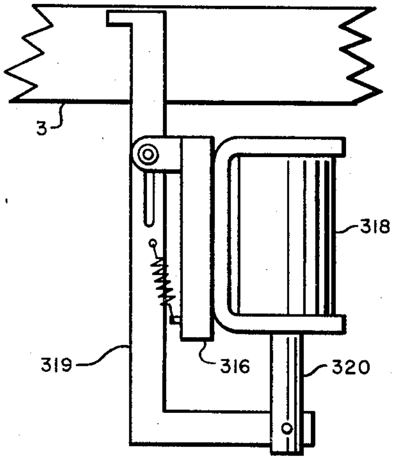
Figure 10:
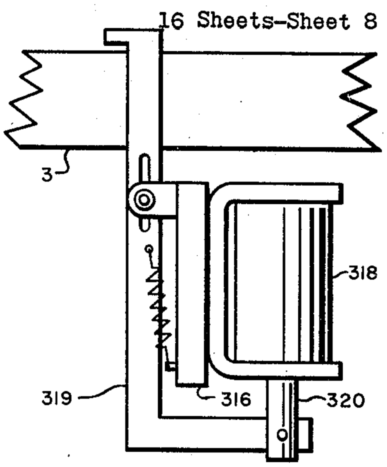
Figure 14:
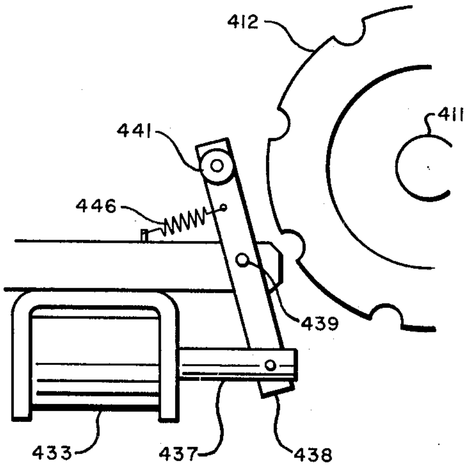
Figure 15:
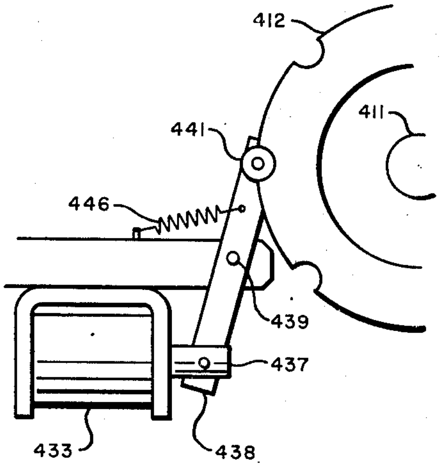
Figure 11:
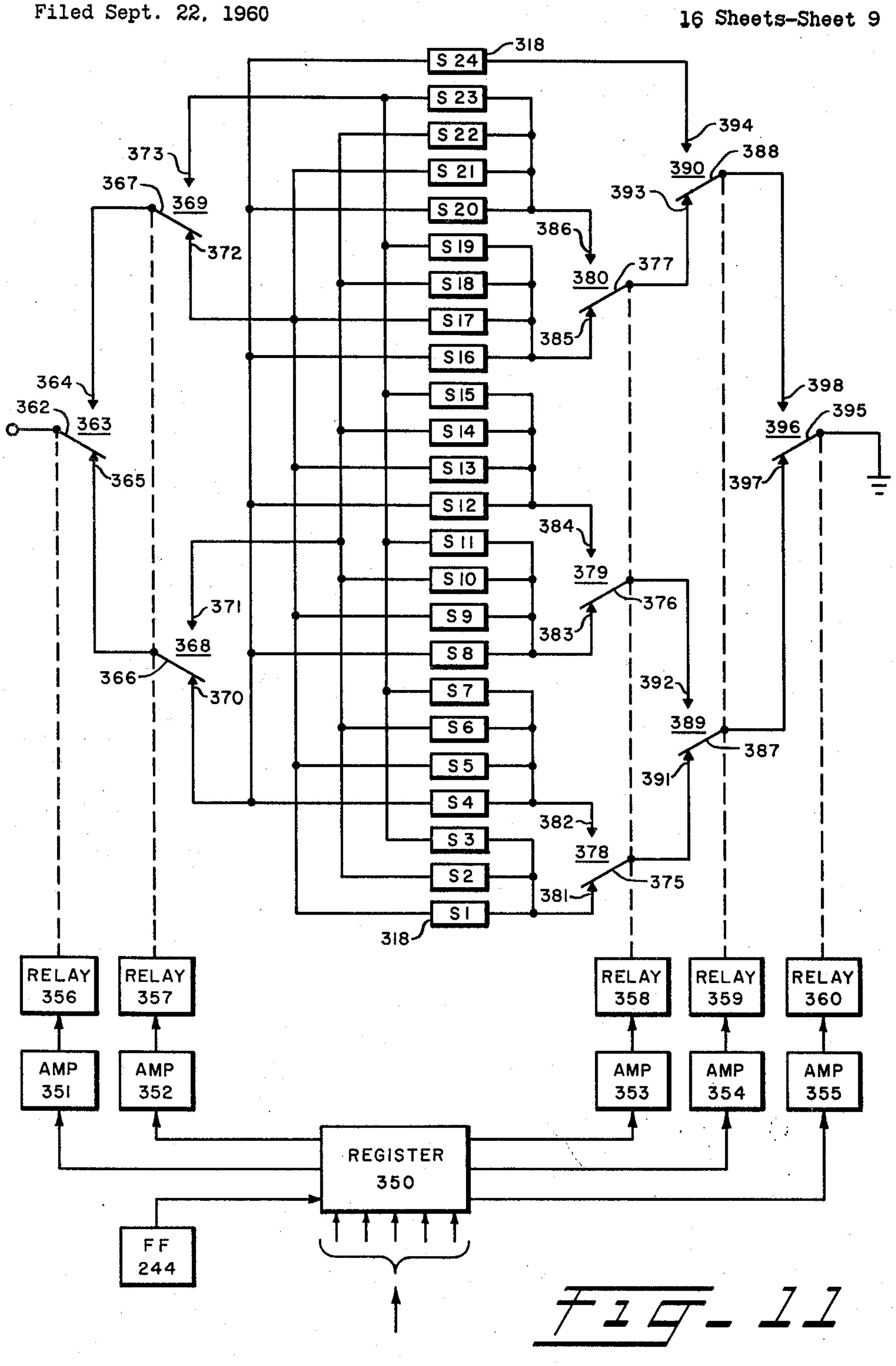
Figure 12:
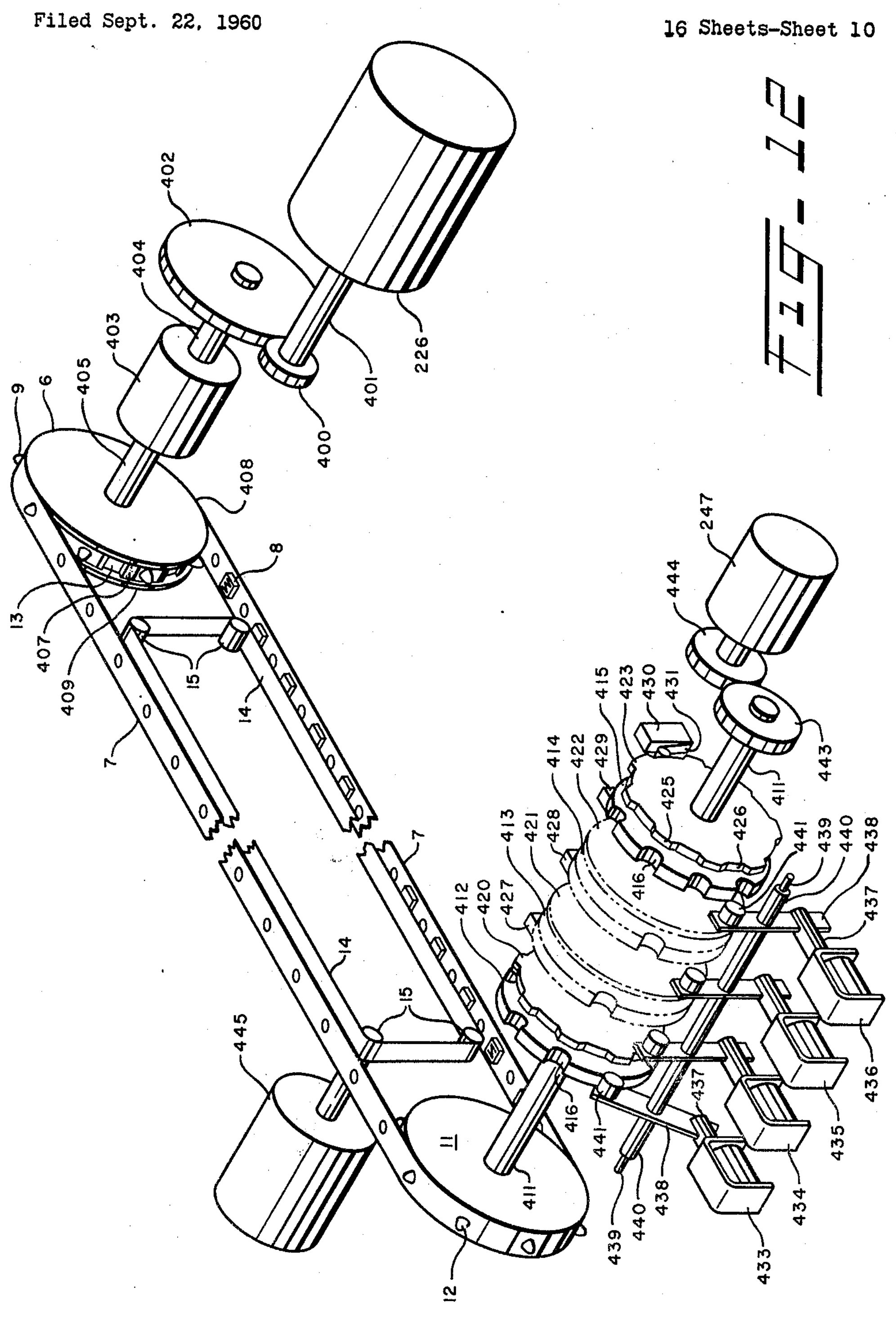
Figure 13:
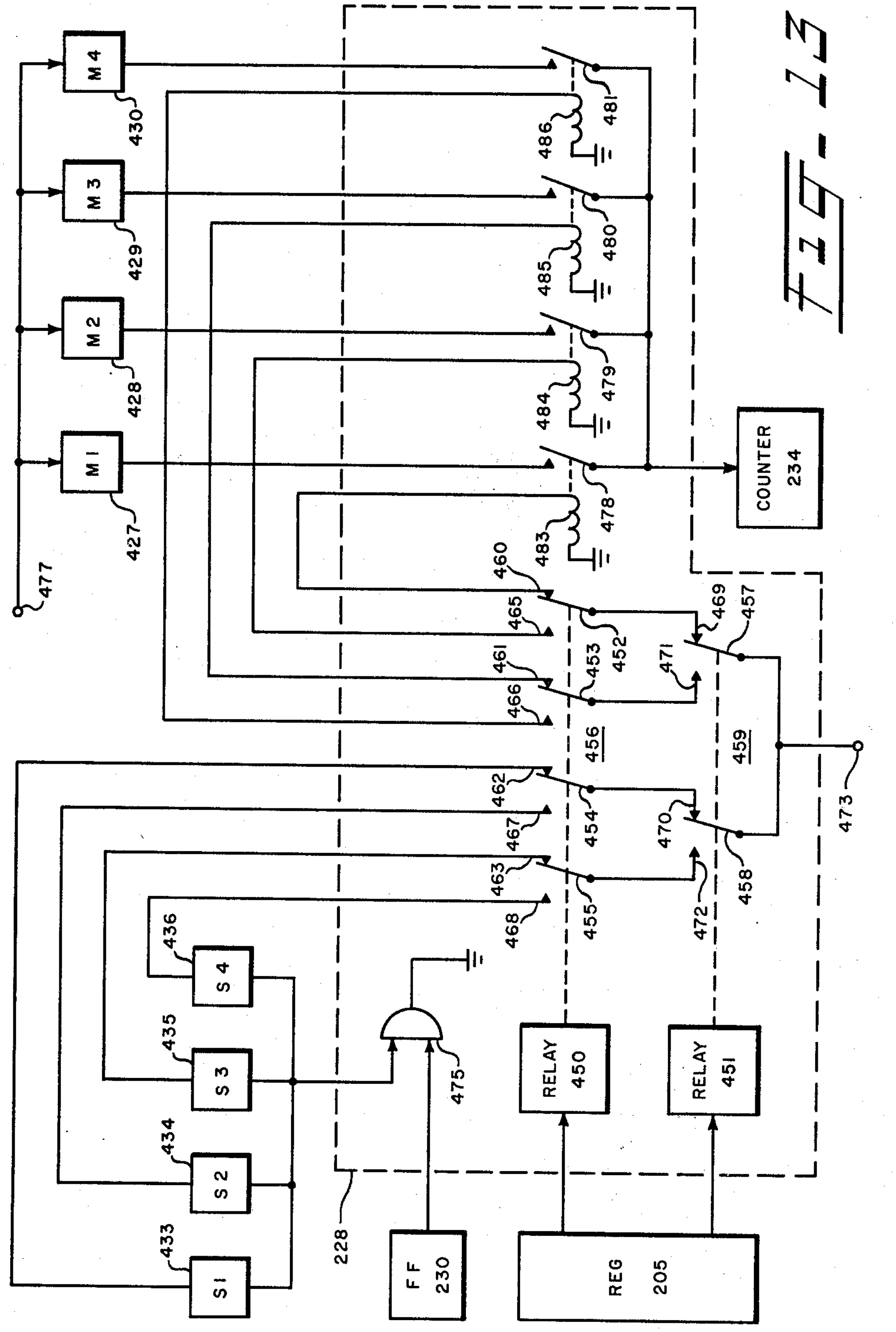
Figure 16:
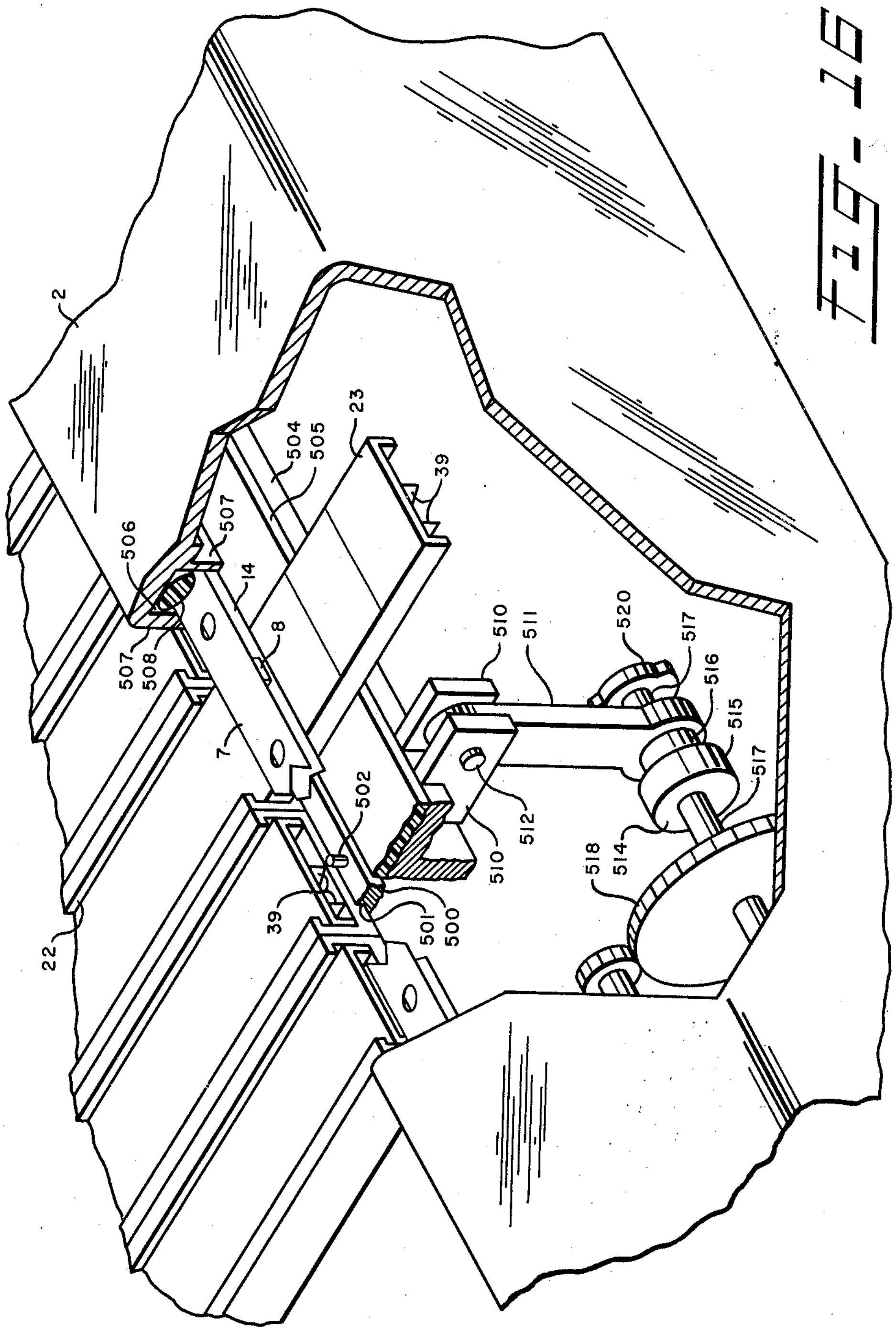
Figure 17:
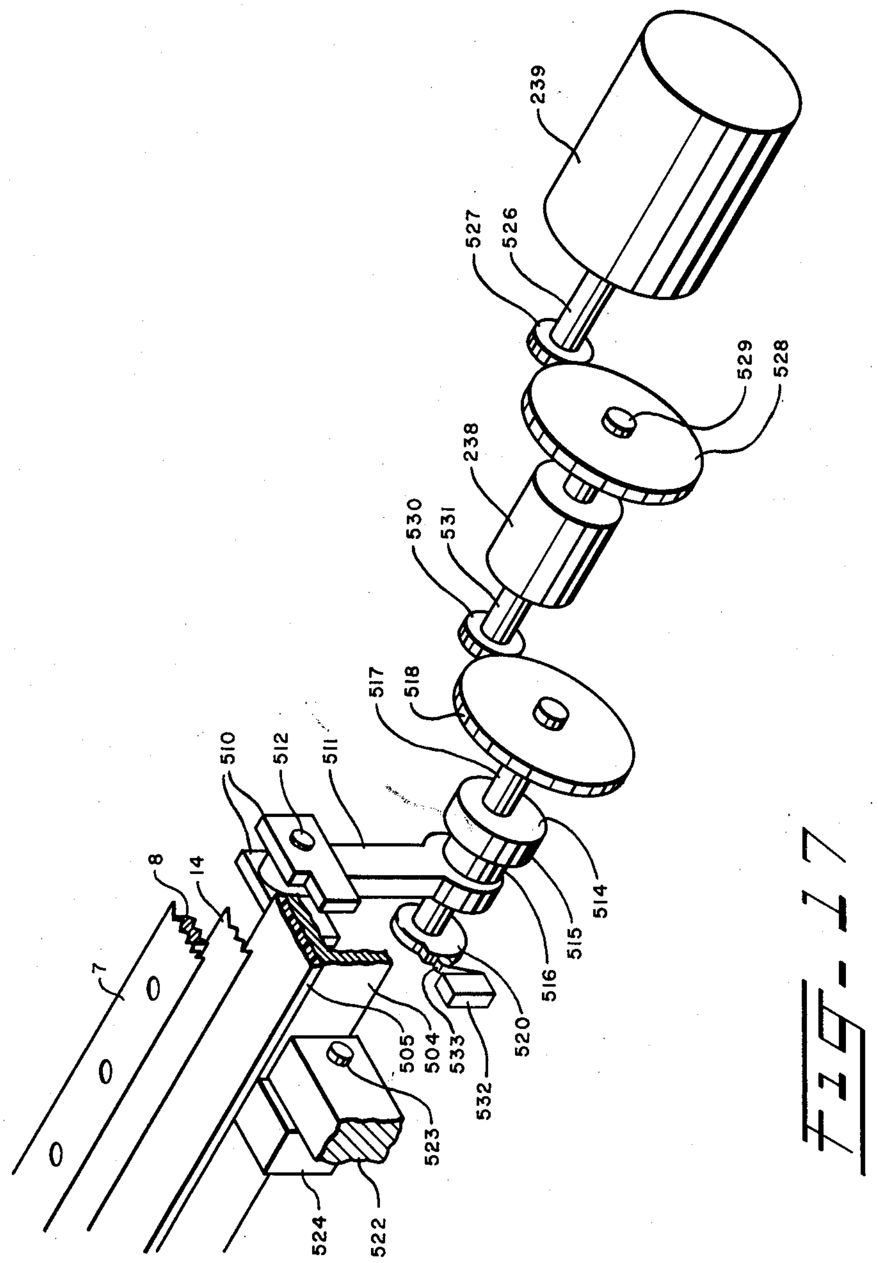
Figure 18:
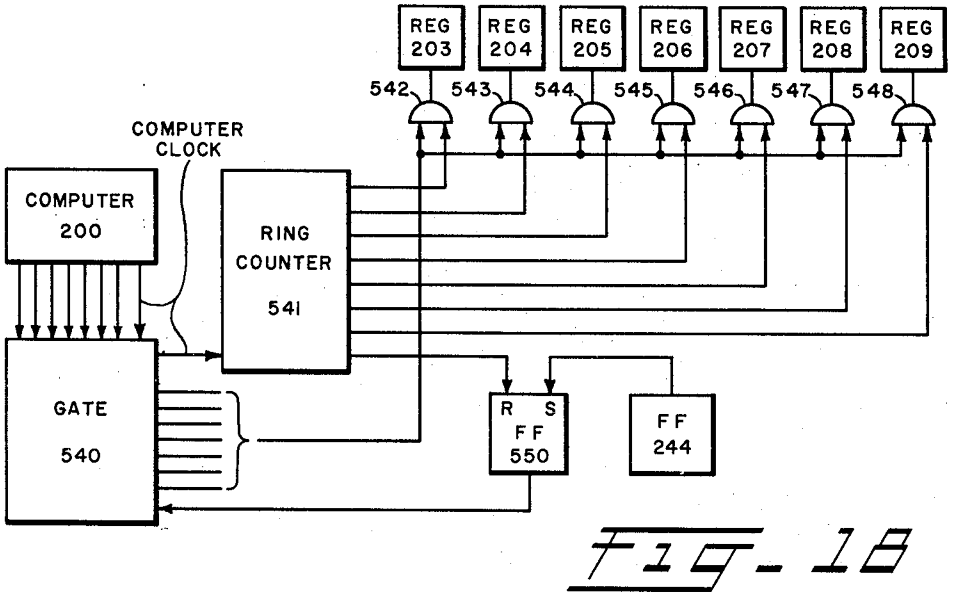
Figure 19:
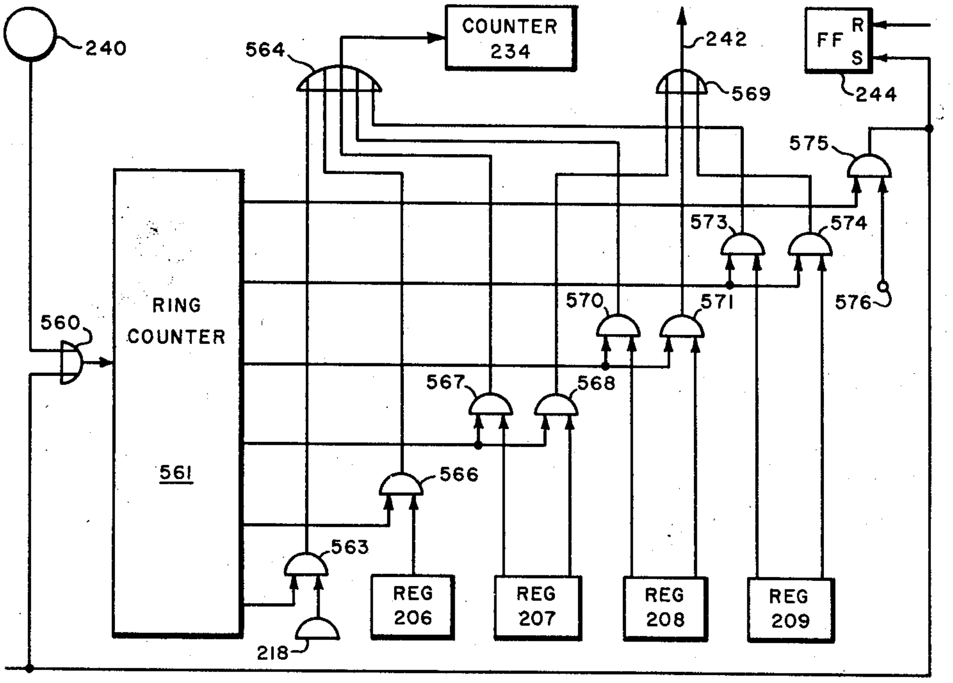
Figure 20:
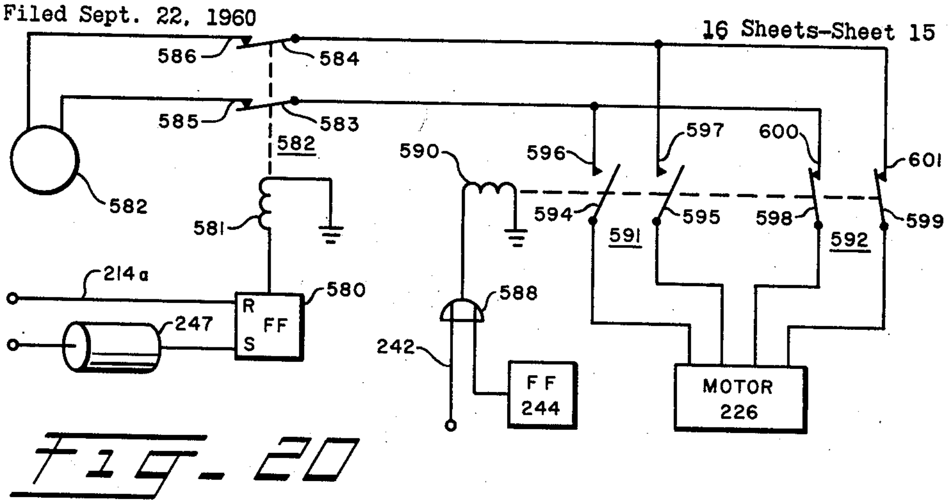
Figure 21:
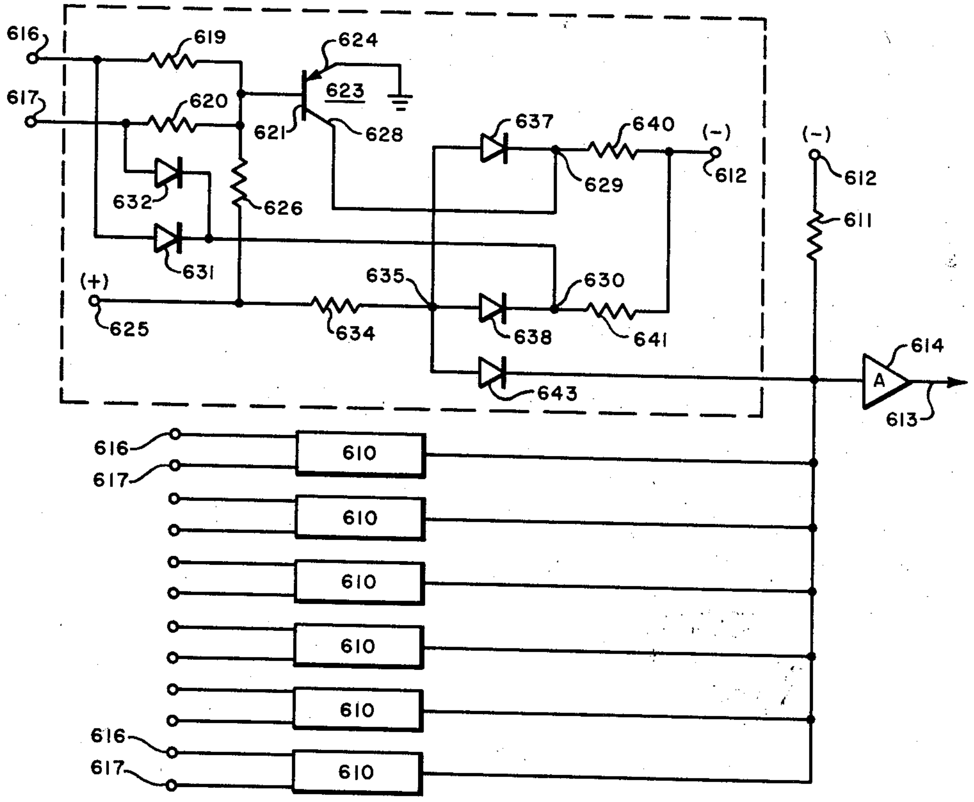
Figure 22:
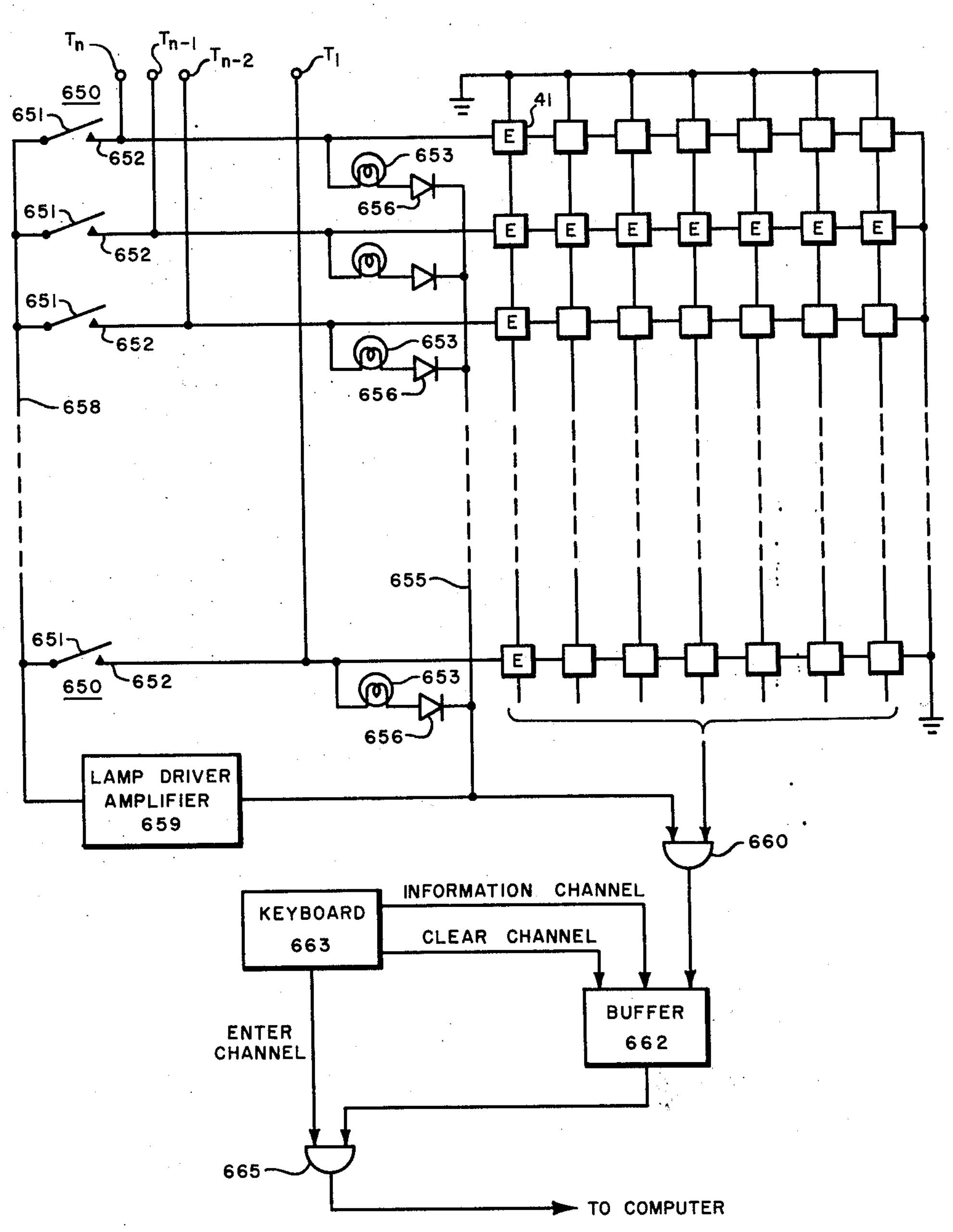

FIGURES 5*a* and 5*b* together comprise a block diagram of a complete single bay data processing and display system;

FIGURE 5*c* is a block diagram of alternate circuit arrangement which may be used in the circuit shown in FIGURE 5*a* and 5*b*;

FIGURE 6 is a block diagram of a disturbance detection circuit suitable for use in the circuit of FIGURE 5;

FIGURE 7 is a series of graphs for illustrating the time relationship of various signals employed in the circuits of FIGURES 5 and 6;

FIGURE 8 is an isometric view of the essential elements of the holder selecting mechanism and the column positioning drive with all the support and covering structure removed;

FIGURES 9 and 10 are side elevations of individual holder selectors shown in both of their operating positions;

FIGURE 11 is a schematic diagram of the holder selector unit shown in FIGURE 5;

FIGURE 12 is an isometric view of the essential elements of the novel printing mechanism and print positioning drive with all of the support and covering structure removed;

FIGURE 13 is a block and schematic diagram of the selector circuit of FIGURE 5 and its interconnection with the printing mechanism brake and detector units;

FIGURES 14 and 15 are side elevations of an individual braking mechanism shown in both of its operating positions;

FIGURE 16 is an isometric of the holder locking mechanism and portions of the depression mechanism and the depression detector;

FIGURE 17 is another view of the depression mechanism and the detector with all of the support and covering structure removed;

FIGURE 18 is a schematic diagram of the distributor shown in FIGURE 5;

FIGURE 19 is a schematic diagram of the step switch shown in FIGURE 5;

FIGURE 20 is a schematic diagram of one of the motor control switches shown in FIGURE 5;

FIGURE 21 a is schematic diagram of the comparator shown in FIGURE 5; and,

FIGURE 22 is a schematic and block diagram showing how the scanning system may be used to address information to the computer shown in FIGURE 5.

Figure 1:
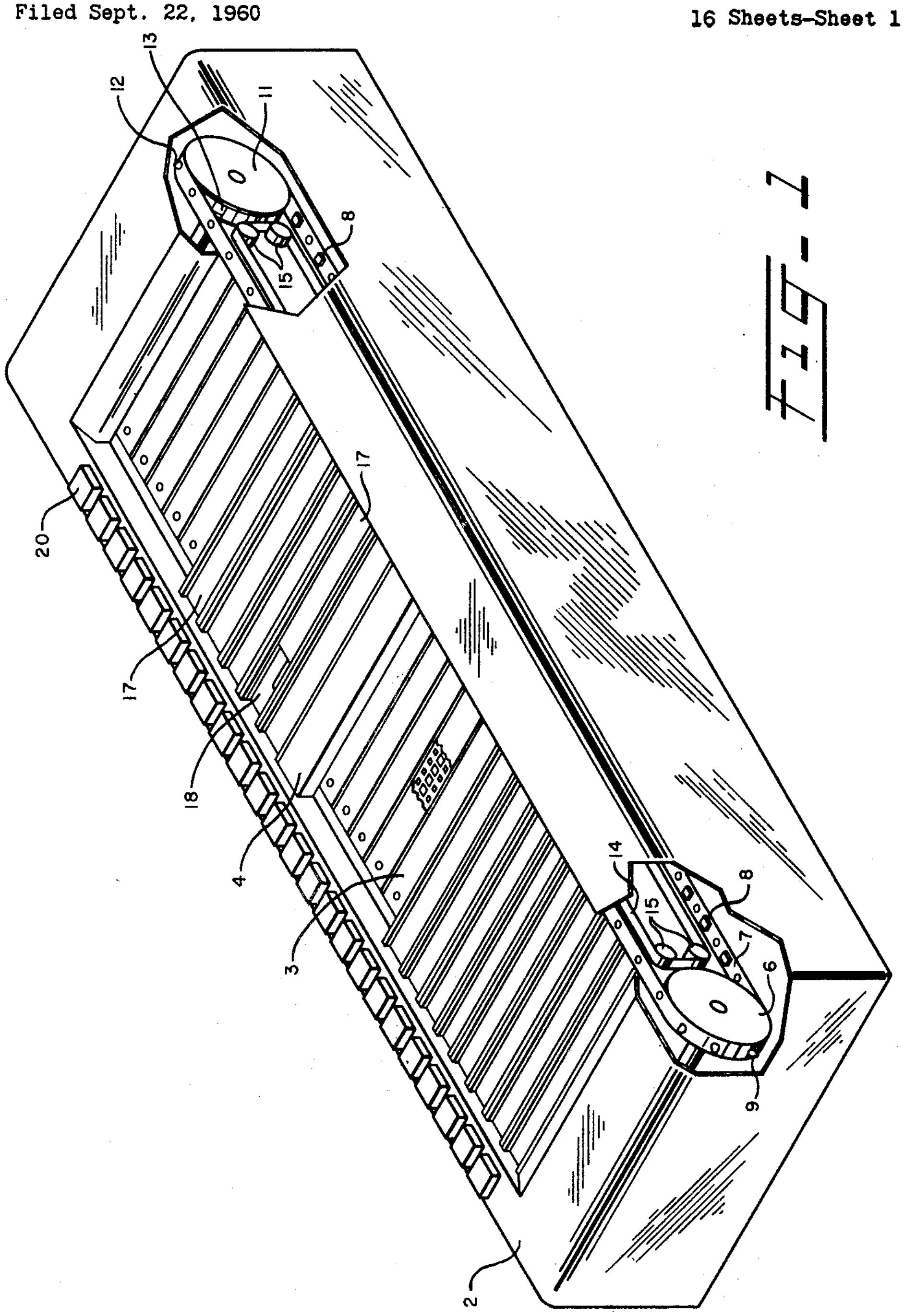
FIGURE 1 is an isometric view of a complete bay of a data processing and display system.

In FIGURE 1, a complete single bay console unit is shown in isometric and comprises an outer cover 2 within which are mounted 24 similar units 3 on a support structure not visible but located within the central opening in the top surface of cover 2. Each of the units 3 includes a plurality of laminated iron cores which will be described in greater detail later. The cores have 3 legs joined by a common piece and bear 3 different windings, one on each leg. The ends of some of the cores are visible on two of the units in the central portion of the console where the covering, which may be paint or some other non-magnetic covering, has been removed. Each of units 3 has a pair of holes, only one of which is shown on one end, the other being obscured by the cover. These holes are used for locating and restricting movement of one or more spacer elements 4, the function of which will be described later.

The portion of the console shown where the cover 2 is broken away discloses the printing mechanism and its relationship to the other portions of the console. The drive pulley 6 is connected to a motor which is not shown and drives a tape 7 which bears on its inwardly facing surface a plurality of characters 8. Intermediate characters 8, the tape is perforated and these perforations engage with sprocket teeth 9 on the driving wheel 6 so that the motion of drive pulley 6 is transmitted to the tape without slipping. At the other end of the console the tape is supported on an idler pulley 11 which also has sprocket teeth 12 which are similar to the sprocket teeth 9 on pulley 6. Pulley 11 illustrates how clearance is provided for raised characters 8 since it shows the relieved portions 13 on the face of the pulley in which characters 8 nest when the tape goes over the pulley. An inked ribbon 14 is mounted on four pulleys 15, one of which is driven by a motor not shown. Ribbon 14 rotates at a constant but very slow speed and is mounted concentric with tape 7 and is located inwardly thereof.

Figure 2:
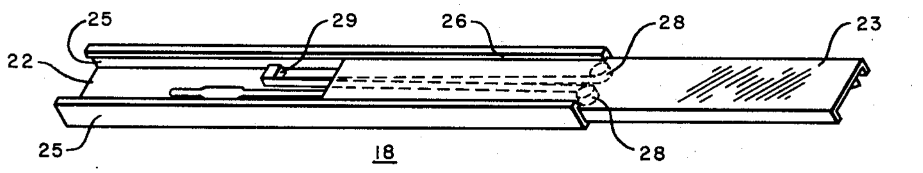
FIGURE 2 is an isometric view of a single strip holder looking at the top.
Figure 3:
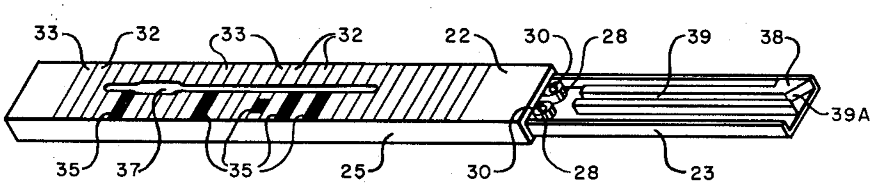
FIGURE 3 is an isometric view of the holder shown in FIGURE 2 looking at the bottom.

As was previously stated, the principal object of the invention is to display the data received in permanent form. According to the embodiment chosen for illustration, each paper strip 17 is secured to a movable portion of a holder 18 which is mounted on top of a unit 3. Holders 18 have the same width as units 3 from top to bottom and when they are stacked as shown on top of units 3 each holder will occupy the same space as a single unit. The holders are however staggered with respect to units 3 so that they do not concide with them. In fact, each holder overlies about ⅓ of one unit and ⅔ of the adjacent unit. This places the space between adjacent units directly under a slot in the holder which is shown and described in FIGURES 2 and 3. The movable portion of holder 18 is obscured by the strip 17 but the holder is illustrated in FIGURES 2 and 3 and will be described in detail later in connection with those figures. One of the holders is shown with the movable portion displaced to the right. The movable portion of the holder and the paper mounted thereon, are positioned directly under the character-bearing tape 7. The extent of the lateral displacement of the movable portion of the holder is a function of the up-date message being recorded; e.g., if the up-date message is to be recorded in the first column appearing on the left of the strip, the maximum lateral displacement will result. Additionally, the position or total rotation of drive pulley 6 from an arbitrarily selected zero or neutral position is also a function of the up-date message since it is rotated to position the correct character over the strip which has been displaced. When both the lateral movement of the holder and the positioning of pulley 6 have been completed a depression mechanism not shown in this figure is actuated to imprint the character previously positioned on the strip. This process is repeated by successive movements of both the holder and pulley 6 until the complete up-date message has been entered.

A plurality of switch buttons 20 are shown protruding through openings on the left side of cover 2. Buttons 20 are equal in number to the number of units 3 and are positioned co-lateral therewith. The arrangement of the switch buttons and their function will be described later.

In FIGURE 2 holder 18 is shown in its extended or printing position in order to reveal details which would otherwise be concealed between the fixed lower or base portion 22 and the upper or movable portion 23. The movable portion 23 is generally channel shaped and rides along the flat bottom portion of the base 22. It rides between vertical side walls 25 which are integral with the flat bottom and normal thereto. Two flanges 26 extend inwardly from vertical walls 25 to overlie the top marginal portion of movable member 23 and prevent it from lifting out of sliding contact with the bottom of base member 22.

Base member 22 and movable member 23 are attached to each other by two identical springs 28 mounted back to back. Springs 28 are fastened at one end to a block 29 which is secured to base member 22. The free ends of springs 28 are coiled around a pair of pins 30 which are rigidly attached to movable member 23. Thus springs 28 urge movable member 23 to a rest position where the movable member 23 is in positional alignment with base member 22. Pins 30 and portions of springs 28 are shown in dashed line in FIGURE 2 since they are located between the two members and are therefore not entirely visible.

Holder 18 is also shown in its extended position in FIGURE 3 but a bottom view is shown. The bottom surface of base 22 has alternate lands and grooves 32 and 33, respectively, over the major portion of the bottom surface. Certain of the grooves have magnetically permeable members 35 attached therein. The permeable pieces 35 are attached to base 22 and positioned in the groove and they protrude above the adjacent lands 32 very slightly so that each piece makes magnetic contact with the free end of the center leg and one of the outside legs of a core 41 shown in FIGURE 4. The pieces 35 represent the holder code and each holder in use will have a different code so that when a bay is loaded with holders each holder code will be distinct. Each holder has a short magnetically permeable piece located in the same groove so that when all of the holders are in a bay the short pieces fall in a single line which extends from the top to the bottom. These short pieces supply a clock or sprocket pulse on the center line of the scanning matrix which is described later. The short pieces will readily indicate when the holders are not properly positioned since the slightest degree of misalignment of the holder will break contact with one of the free ends which results in a decrease in the flux through the piece. This is detected in a manner to be described later for indicating a disturbance of the holders in the bay. The other pieces are full size to assure a complete magnetic circuit through the pieces.

Base portion 22 has an elongated slot 37 through the bottom surface which extends parallel to side portions 25. Slot 37 is widened at one end so as to facilitate the passage of actuating member, not shown in this figure, which engages a detent in movable member 23. When the actuating member is engaged in the detent it is displaced to the right and thus moves movable member 23 and the strip which it bears to the printing position as illustrated in both FIGURES 2 and 3. The actuating member and the transport mechanism which moves it are shown in detail in FIGURE 8 and will be described later in detail.

The underside of movable member 23 has a guide 38 attached thereto which includes an elongated slot 39 which terminates in a widened portion 39A. Widened portion 39A is adapted to make contact with a guide pin mounted in the bay and slot 39 cooperates with the guide pin to accurately position member 23 for printing. The guide pins are shown in FIGURE 16. Each holder position has a guide pin and when the holder, in a given position, is to be up-dated the guide pin associated with that holder position guides the movable portion 23 so that correct vertical alignment of the holder and its associated strip is obtained. In addition to the above the guide pin in cooperation with slot 38 locks the holder against vertical movement in the bay.

Figure 4:
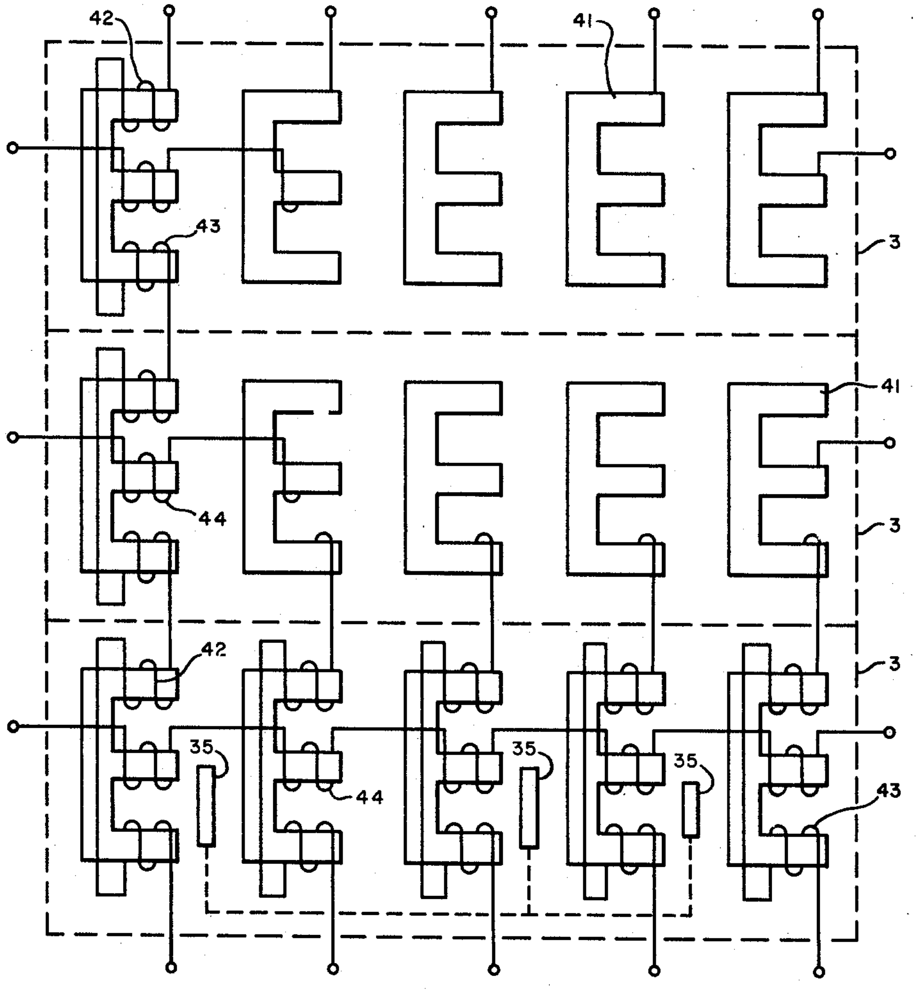
FIGURE 4 is a schematic wiring diagram of a portion of the novel scanning system.

FIGURE 4 illustrates schematically the arrangement of the laminated iron cores and their associated windings which make up units 3 shown in FIGURE 1. Each unit comprises a plurality of laminated E-shaped cores 41 arranged horizontally side by side with the open ends facing toward the upper surface of the console. All of the cores comprising the units 3 form a rectangular matrix having cores in both vertical and horizontal alignment. Each of the legs of the cores bears a winding. All of the windings 42 on the upper leg of each core are wound in one sense and all of the windings 43 on the lower leg of each core are wound in the opposite sense. All of the windings 44 on the central legs are all wound in the same sense. The upper and lower windings 42 and 43 in each vertical column of cores are connected in series and the windings 44 in each of the central cores in a horizontal row are connected in series with each other. Thus, when a pulse of electrical energy is applied to the series connected coil of each horizontal row of coils, pulses are induced in the upper and lower coils 42 and 43 associated with the cores in that particular row. Since the upper and lower cores are connected in series and are oppositely wound the pulses induced therein will in the absence of anything else cancel each other out and no net output will appear. But, on the other hand, if the flux path between the central leg and one of the end legs of a given core is increased, then the magnitude of the induced voltage in that winding would exceed the magnitude of the induced voltage in the other and a net output would appear. This condition is illustrated in the bottom line where metallic shorting bars are shown connecting the lower leg and the central leg of the 1st, 3rd, and 4th cores on the first line.

The scanning system operates as follows:

Each of units 3 are identical. The strip-bearing holders which may be inserted are unique in that each, as previously described, bears a different combination of shorting bars. The units 3 are pulsed successively and whenever a shorting bar is present in a vertical column an output pulse appears on that column output.

FIGURES *5a* and *5b* taken together constitute a functional block diagram of the up-date portion of the tabular bay and will be referred to hereafter as FIGURE 5. The computer 200 supplies the up-dating information on seven parallel lines through an "and" gate 201 to a distributor 202 where it is assembled and transferred to the unit in a manner which will be subsequently described. The information from the computer arrives in groups of seven parallel simultaneous bits. Each group of seven bits comprises one distinct portion of the up-date and a complete up-date includes seven sequential groups. Thus, each complete up-date contains forty-nine bits. The first group contains the holder code of the flight strip which is to be up-dated. The second group identifies the type of up-date by designating in which of the five groups of columns on the strip the actual up-date message is to be printed. The third group indicates on which of the four lines in the selected column group the up-date is to be printed. Groups four through seven designate the first through fourth characters respectively of the actual up-date message.

The first group of bits which designate the holder code of the flight strip being up-dated are transferred by distributor 202 to a holder code register 203. The second group of bits which identify the type of up-date message by designating the column group on the strip in which the up-date message is to be printed are transferred by distributor 202 to a column register 204. The third group of bits which select the correct line for the up-date are transferred by distributor 202 to a line register 205. The fourth, fifth, sixth and seventh groups are applied to character registers 206, 207, 208 and 209, respectively, by distributor 202. Thus, register 206 contains the first character of the up-date and registers 207, 208 and 209 the second, third and fourth characters, respectively.

The holder code contained within register 203 is applied to a comparator 211. It is compared in comparator 211 with all of the holder codes in the bay 212. Whenever a flight strip is prepared it is mounted in a holder which has a unique code impressed thereon. The holder code, the fix point and aircraft identification are sent to the computer where they are equated and all messages directed to that partciular aircraft identification and fix point are thereafter identified by the holder code. Thus, the holder code transmitted with the up-date will correspond to one of the codes on the holders assembled in bay 212 if that holder is located in the bay. The holders in bay 212 are continuously serially scanned and the codes contained thereon applied serially to comparator 211 and when one of these codes coincides with the holder code in register 203 a pulse is emitted on conductor 213.

Scanning is accomplished by generating pulses in a multivibrator 215 and counting these in a binary digital counter 216 the outputs of which are applied serially to the bay through a switching matrix 217. The first pulse is applied to read the first holder code and each succeeding pulse reads the next succeeding holder code until all have been read whereupon the process is repeated. The total number of pulses counted exceeds the number of possible holder code positions by one and this pulse is designated $T_0$. This pulse occurs after the last holder code scanning pulse and before the first. The $T_0$ pulse is used for timing since it indicates the end of one scan and the beginning of the next. The particular use of this pulse will be illustrated and explained elsewhere. An explanation of how the holder codes are read will be deferred until later.

When a successful comparison has been made the pulse supplied on conductor 213 is used to gate the count of digital counter 216 through an "and" gate 218. The count is impressed on a selector unit 220 which selects the corresponding holder in bay 212 and mechanically connects its movable portion to the output of a motor 221 by solenoid means to be shown and described in detail later.

The output of comparator 211 is also applied to the set input of a flip-flop 214 which develops an output on a conductor 214a. Conductor 214a is connected to motor control switch 221a and provides for energization of motor 221 which moves the movable portion of the selected holder laterally to the printing position which is located to the right of bay 212.

The output of column register 204 is applied to a binary counter 222. A detector 223 connected in the drive chain of motor 221 supplies pulses each of which indicates a predetermined distance traveled by the drive chain and the holder connected to it.

These pulses bear a relationship to the coded column information in register 204 and are applied to count down the total inserted into counter 222. A zero detector 224 which may in its most elemental form be an "and" gate, monitors the counter output and when it is reduced to zero it sets a flip-flop 225 which energizes a brake 225a which locks the drive chain of motor 221 to thus stop the strip holder in the correct column position for the insertion of the up-date.

Conductor 214a is also connected to a motor control switch 226a which provides for the energization of motor 226 which positions the printing mechanism 227 over the correct strip in a manner which will be described.

Each of the strips mounted in a holder in bay 212 has four lines in each of the 20 updatable columns on the right hand side of the strip. The up-date message from the computer indicates on which of the four lines the up-date is to be printed. This information is contained in line register 205. The output of register 205 is connected through a selector 228 to one section only of a four section brake unit 230a, each section of which is similar to brake 225a. It is also connected to one section only of a four section detector 231, each section of which is similar to detector 223. Each of the sections of brake 230a and detector 231 are biased one line space from adjacent sections and thus provide the necessary control for printing the up-date on the line indicated in the up-date message supplied by the computer. The operation and structure of brake 230a and detector 231 are illustrated in FIGURE 12 and will be described fully later in connection with the description of said figure.

Character registers 206, 207, 208 and 209 are each connected to a different input of step switch 233 which connects each register in turn to a counter 234 which is identical to counter 222. The output of counter 234 is connected to a zero detecting circuit 235 which is identical to zero detecting circuit 224 and the output of detector 235 is used to set a flip-flop 230 which will energize brake 230a. When register 206 is connected to counter 234 the counter output equals the register output and zero detector 235 has no output. Therefore, flip-flop 230 is reset and brake 230a is disengaged which permits motor 226 to operate and move the printing mechanism. As the mechanism moves, the selected detector unit of detector 231 supplies pulses to counter 234 which reduces its count as the printing mechanism is moved.

When the counter reaches zero, detector 235 energizes the selected unit of brake 230a and stops the printing mechanism in the correct position for printing the first character of the up-date on the strip previously selected. The printing mechanism is at a known zero position at the start of an up-date message and the computer indicates the position on the printing mechanism of the first character of the message. This is the information supplied to register 206 by the computer. The output of detector 231 keeps track of the movement of the printing mechanism and zero detector 235 detects positional coincidence of the printing mechanism and the correct character as contained in register 206. When this condition is reached the brake is applied since the correct character will be in the correct line position for printing. With the system as described so far the proper character would always be positioned over the first strip. This is necessarily so since the computer does not know where the particular holder and its associated strip are located in the bay. Therefore, it merely sends the character position and in order that it be properly positioned the bay position of the holder must be added to the positional information relative to the first character supplied by the computer. To this end the output of "and" gate 218 which corresponds to the position of the strip to be up-dated in the bay is added to the positional information relative to the character contained in register 206. This is accomplished by initially inserting the bay position of the correct holder in counter 234 via switch 233 which permits motor 226 to move the printing mechanism an amount sufficient to compensate for the displacement of the strip holder to be up-dated from the first position.

The output of zero detector 224 is also connected to the set input of a flip-flop 237a which has its output connected to an "and" gate 237 and the output of zero detector 235 is connected to the set input of a flip-flop 237b which has its output connected to the other input of gate 237. The output of gate 237 is used to energize a clutch 238 which connects the output shaft of a constant speed motor 239 to the print mechanism to imprint the selected character on the strip. A detector 240 emits a pulse which has a leading and a trailing edge when the output shaft of clutch 238 has completed substantially one revolution. The trailing edge of this pulse is used to de-energize the clutch so that over printing is avoided. It is also connected to the input of counter 222 to increase its count by one each time the clutch has closed and a printing operation is completed to increase the value of counter 222. The trailing edge of the output from detector 240 is also applied to the reset input of flip-flop 225 which releases brake 225a and permits motor 221 to move the holder to the right by one position. This permits the second character to be printed in the second position on the strip since detector 223 reduces the count in counter 222 to zero after that amount of movement. Thereafter brake 225a is again energized by the output from flip-flop 225 which is set by the output from zero detector 224.

The leading edge of the pulse from detector 240 is applied to step switch 233 via an "or" gate 241 to connect register 207 to counter 234. When this register is connected the output of counter 234 goes up and the output of zero detector 235 falls. Brake 230a is also released by the trailing edge of the pulse from detector 240. In this instance it is applied to the reset input of flip-flop 230 which de-energizes brake 230a which permits motor 226 to move printing mechanism 227 to the next character position which is determined in exactly the same way as for the first character. Flip-flops 237a and 237b are both reset by the trailing edge of the output from detector 240. When the printing is over both of these flip-flops must be reset to extinguish their outputs to prepare for the next printing operation. This process or sequence of events is repeated until all of the characters in the up-date are printed in four successive positions on the selected line.

The computer gives the actual displacement of the first character from an arbitrarily selected zero position on the printing mechanism but the position of each of the succeeding characters is given as a differential and a direction signal, that is, for the second character the number of positions from the first character and the direction of movement necessary to reach the second character. Therefore, an additional conductor 242 is provided from switch 233 to motor control switch **226*a* to provide for the correct rotation of motor 226**. The third character is given as the number of positions from the second and a direction signal and the fourth character as the number of positions from the third plus a direction signal.

After the fourth character has been printed detector 240 applies a fourth pulse to step switch 233 which provides an output on a conductor 243 which sets a flip-flop 224. Conductor 243 is also connected back to the same input of switch 233 as is the output of detector 240 via "or" gate 241 to step the switch back to its original position, so that the output of "and" gate 218 is connected through step switch 233 to counter 234. Conductor 243 is also connected to registers 203, 204, 205, 206, 207, 208 and 209 to reset same to zero since the up-date has been completed.

The output of flip-flop 244 is applied to motor control switches **221*a* and 226*a* in such a manner as to cause motors 221 and 226 to drive their respective loads back to a zero or starting position. The output of flip-flop 244 is also applied to flip-flop 214 to reset that flip-flop and to selector 220 to place selector 220 in a neutral condition. It is also applied to the input of counter 222 to inhibit the pulse from detector 240 after the fourth character has been printed, and finally the output of flip-flop 244 is applied to "and" gate 201 to permit the next up-date in the computer to enter distributor 202. After the next up-date has been accepted by distributor 202 it emits a pulse on a conductor 245 which is applied to reset flip-flop 244**.

When flip-flop 244 is first set by the output from step switch 233 on conductor 243 motors 211 and 226 are reverse driven to return their respective loads to their zero position. The zero position is detected by limit detectors 246 and 247 connected to the outputs of motors 221 and 226, respectively. Each of the limit detectors emits a pulse when the load attached to its respective motor reaches its zero position. The pulses thus derived are applied to the associated motor control switch which deenergize the associated motor and causes the load to come to rest at the zero position.

Once the new up-date has been entered in distributor 202 and flip-flop 244 has been reset the device is again ready to process the new up-date in the same manner as previously described.

With the arrangement described and shown in FIGURES *5a* and *5b*, the column information from the computer 200 must be biased by one column position to compensate for the column movement which occurs when the initial blank is printed since the column will be advanced one position after the blank is printed. This may be avoided if the circuit shown in FIGURE *5c* is used. All of the connections in FIGURES *5a* and *5b* remain the same as shown but the elements shown in FIGURE *5c* are connected in addition as shown therein. Those elements shown in FIGURES *5a* and *5b* to which the connections are made are duplicated in FIGURE *5c* in order to simplify the explanation.

The output on conductor 243, which occurs after the last character has been printed, is applied to the set input of a flip-flop 248 and the flip-flop output on conductor **248*a* is applied to one input of an "and" gate 249 to enable the gate. When the output of counter 216 is inserted into counter 234, detector 231 starts the count down as the printing mechanism is positioned. When counter 234 reaches zero, detector 235 provides an output which sets flip-flops 230 and 237*b* and in this embodiment it is also applied to gate 249 which has been enabled after the last character has been printed. The output of gate 249 is applied through "or" gate 230*b* and 237*c* to the reset inputs of flip-flops 230 and 237*b*, respectively, and to "or" gate 241 to step switch 223 so that the contents of register 206 are inserted into counter 234**.

The output of gate 249 is delayed in a circuit **249*a* and applied to the reset input of flip-flop 248 so that gate 249 will remain disabled until after the fourth character has been printed. By resetting flip-flops 230 and 237*b* and by stepping switch 233 with the output from zero detector 235**, following movement in response to the holder position, printing is not completed and the column position from the computer need not be biased.

The circuit described in FIGURE 5 has no provision for detecting a disturbance of the holders positioned in the bay. This feature of the invention is shown separately in FIGURE 6 and will now be described. Multivibrator 215 and gate 218 are reproduced in FIGURE 6 to show how the structure fits in with the device as previously described.

The bay is deemed to be in a disturbed condition whenever a holder in a column of holders is not immediately followed by another holder. That is, referring to FIGURE 1 again, the bay is undisturbed from positions 1 through 8 since eight holders are adjacent to each other in stacked relation. However, that portion of the bay between holder position 9 and the bay spacer 4 is according to the above definition a disturbed bed area and should a holder which is to be up-dated be found in positions 10 through 13 an up-date should not be entered on that holder since it may be moving or about to be moved. Bay spacer 4 is as previously described firmly positioned within the bay and cannot move up or down since it bears lugs which are inserted in the holes in unit 3. The spacer bears a unique fixed code which when detected, as will be described later, indicates that the area above it, which in the case of FIGURE 1 extends for 5 holder positions, is not disturbed. Thus, until such time as a holder above the spacer is not immediately followed by another holder the bay remains undisturbed. The circuits are arranged so that those holders in an undisturbed area may be up-dated. In FIGURE 1, for example, holders 1–8 may be up-dated and holders 1–5 following spacer 4 may be up-dated. If a holder is placed in the 9th position it may also be up-dated since it is preceded by an uninterrupted column of holders. If, however, it is placed in the 10th position it could not be up-dated since it is in a disturbed area. This is also true for those holders above bay spacer 4. Furthermore, more than one bay spacer may be used in the bay and when so used it functions the same as the one previously described.

In FIGURE 6 one of the outputs $C_B$ of multivibrator 215 is applied to a differentiating and clipping circuit 250 which supplies a pulse output of very narrow width occurring at the negative going edge of the output pulse $C_B$ from multivibrator 215. This pulse will be referred to as $C_R$ hereafter. The other output $C_A$ of multivibrator 215, $C_B$ and $C_R$ are shown graphically in FIGURE 7.

Before proceeding further with the description of the disturbance detection circuit it is probably best to clarify a few points. First, there are two conditions of operation. That is undisturbed and disturbed. Secondly, when the bay is undisturbed gate 218 and flip-flop 214 are controlled by comparator 211 and its output on conductor 213; and thirdly, under two conditions only the bay will always be shifted to the undisturbed condition regardless of its previous state. The first condition when the bay will be shifted is after the occurrence of the $T_0$ pulse; and the second condition after the detection of a bay spacer by comparator 253.

The means for detecting a bay spacer comprises a comparator 253 which is identical to comparator 211 and is connected to the vertical columns of cores in the matrix shown in FIGURE 4 as is comparator 211. Unlike comparator 211 the other inputs are connected to a static register 254 which contains the code or codes appropriated for the bay spacers. Thus, whenever a bay spacer is encountered during the scanning of the bay an output is developed at comparator 253.

This output is applied to the set input of a flip-flop 256 through an "or" gate 257. The $T_0$ pulse is also applied to the set input of flip-flop 256 through "or" gate 257. Whenever flip-flop 256 is set an output is provided on conductor 258 which enables gate 218 and places it under the control of the output from comparator 211 on conductor 213. Conductor 258 is also connected to another "and" gate 259 which was not shown in FIGURE 5. This enables gate 259 and also places it under control of the output from comparator 211 on conductor 213 which sets flip-flop 214 when conductor 213 is energized as previously described. The function of flip-flop 214 is the same as previously described.

The $C_R$ pulse from circuit 250 is applied to the set input of a flip-flop 260 which enables an "and" gate 261 and the $C_A$ output from multivibrator 215 is applied to the other input of "and" gate 261. If gate 261 is enabled by flip-flop 260 the $C_A$ pulse will reset flip-flop 256 which extinguish the enabling output on conductor 258 to inhibit "and" gates 218 and 259. When "and" gate 259 is inhibited flip-flop 214 is no longer under the control of the output from comparator 211. When gate 218 is inhibited no up-date may be started. An up-date which is in process may continue since a holder which is in the process of being up-dated cannot be moved. Therefore, a disturbance in the bay will not affect the up-date process adversely. The structure which locks the holder in the bay is shown in FIGURE 16 and will be described in detailed later in connection with the description of that figure.

The sprocket pulses on conductor 262 are applied to the reset input of flip-flop 260 and since they occur prior to $C_A$ and subsequent to $C_R$ the flip-flop will reset before $C_A$ is applied to gate 261. Thus, if a sprocket pulse is present at all times flip-flop 256 will remain set and gates 218 and 259 will be enabled. If, however, a sprocket pulse is missing, $C_A$ will reset flip-flop 256 and gates 218 and 259 will be inhibited. They will remain inhibited until a bay spacer code is detected or a $T_0$ pulse occurs.

The graphs of FIGURE 7 are self-explanatory and should be quite helpful in following the operation of the circuit just described. The four graphs contained in the figure shown in order, the sprocket, $C_R$, $C_A$ and $C_B$. It is obvious that the sprocket will reset flip-flop 260 which is set by $C_R$ prior to the application of the negative portion of $C_A$ to "and" gate 261 and therefore as long as there is a sprocket following $C_R$ gates 218 and 259 are enabled. But should a sprocket pulse fail to appear after a given $C_R$, the $C_A$ pulse which follows the given $C_R$ pulse will reset flip-flop 256 and inhibit gates 218 and 259 until such time as a bay spacer is detected or a $T_0$ pulse occurs.

In FIGURE 8 motor 221, which supplies the motive force for moving the movable portion of strip holder 18 to the printing position, is connected to a drive gear 300 by an overload slip clutch 301. Gear 300 meshes with and drives another gear 303 which is drivingly connected to a shaft 304. The rotation of gear 303 is transmitted through shaft 304 to yet another gear 305 which meshes with and rotates the final drive gear 306.

Drive gear 306 is drivingly connected to a screw 308 and to a timing belt pulley 309. Pulley 309 is drivingly connected to another pulley 310, which is identical to pulley 309, by an endless timing belt 311 and pulley 310 is drivingly connected to a screw 312 which is identical to screw 308. A pair of identical travelling nuts 314 and 315 are mounted on screws 308 and 312, respectively. Nuts 314 and 315 are joined together by a rigid mounting bar 316. Thus, when drive gear 306 rotates in response to the rotation of motor 221 nuts 314 and 315 and the interconnecting mounting bar 316 travel along screws 308 and 312 from left to right or right to left depending on the direction of rotation of motor 221. The mounting bar and the nuts to which it is attached are shown in their extreme left hand or rest position. Limit control 246 is drivingly connected to shaft 304 and is electrically connected to motor 221 as shown in FIGURE 5. As previously explained limit control 246 senses the extreme left hand position of the nuts and de-energizes motor 221 to stop the nuts in this position.

Mounting bar 316 extends from the bottom to the top of the display area of the bay. A plurality of solenoids 318 are attached to bar 316. There is one solenoid for each holder position. Each solenoid has an actuating member 319 connected to the solenoid armature 320. Actuating members 319 are arranged between the units 3 shown in FIGURE 1 and are caused by solenoid energization to extend upwards between the units and through the slot 37 in the base portion 22 of holders 18. The uppermost portion engages the detent on the underside of movable member 23 and when motor 121 is energized the bar moves to the right which results in a corresponding movement of the movable portion 23 of holder 18.

Shaft 304 has a cam wheel 321 keyed thereto. The wheel has two curved surfaces each having a different radius with the larger radius surface extending over a slightly larger portion of the wheel circumference than the smaller radius surface. A microswitch 322 is positioned adjacent the wheel and has an actuating lever 323 which is in alternate rolling contact with the two curved surfaces. When lever 323 is in contact with the smaller radius surface the switch is open and when it is in contact with the larger radius surface the switch is closed. Wheel 321 and microswitch 322 together constitute detector 223 described in FIGURE 5.

One rotation of shaft 304 takes place while actuator 319 and movable member 23 travel one character width in the horizontal direction, thus, each time switch 322 closes a pulse is obtained which indicates a pre-determined amount of horizontal movement. These pulses are applied as previously described to counter 222 which in cooperation with zero detector 224 detects the correct positioning of the strip holder.

Another wheel 325 is keyed to shaft 304; this wheel has a uniform diameter except for a single notch on its circumference. A solenoid 326 is positioned adjacent the wheel 325 and has pivotally mounted lever 327 connected to its armature 328. When the armature is actuated the lever is rotated about the pivot and a stud 329 attached to the free end of lever 323 engages the periphery of wheel 325. As the notch passes the stud it engages the notch and locks shaft 304. Notched wheel 325 and solenoid 326 with its related parts constitute the brake *225a* shown in FIGURE 5.

In FIGURE 9 solenoid 318 is shown in its de-energized positions and in FIGURE 10 in its energized position where actuating member is raised above the uppermost surface of unit 3. In both FIGURES 9 and 10 the same reference numerals have been used to designate the same parts previously described.

In FIGURE 11 the output from counter 216, shown in FIGURE 5, which is gated by "and" gate 218 is applied to a five bit static register 350. The five outputs from register 350 are connected to amplifiers 351 through 355, respectively, and the outputs from amplifiers 351 through 355 are connected to relays 356 through 360, respectively.

Relay 356 is mechanically connected to the armature 362 of a switch 363 which has a pair of contacts 364 and 365. Relay 357 is mechanically connected to the armatures 366 and 367 of a pair of switches 368 and 369 respectively. Switch 368 has a pair of contacts 370 and 371, and switch 369 a pair of contacts 372 and 373. Relay 358 is mechanically connected to the armature 375, 376 and 377 of three switches 378, 379 and 380, respectively. Switch 378 has a pair of contacts 381 and 382, switch 379 a pair of contacts 383 and 384, and switch 380 a pair of contacts 385 and 386. Relay 359 is mechanically connected to the armatures 387 and 388 of a pair of switches 389 and 390, respectively. Switch 389 has a pair of contacts 391 and 392, and switch 390 a pair of contacts 393 and 394. Relay 360 is mechanically connected to the armature 395 of a switch 396 which has a pair of contacts 397 and 398.

Armature 362 is connected to a power supply not shown and armature 395 is connected to ground. All of the armatures are shown in their normal condition, that is, with their connected or actuating relays de-energized. Solenoids 318 are shown in a column and are designated S1 through S24. Each of the solenoids is connected to two switch contacts and they are so arranged that when relay 356 only is energized solenoid S1 only will be energized. When relay 357 is energized solenoid S2 only will be energized. When both relays 356 and 357 are energized solenoid S3 only will be energized.

The arrangement is such that if relays 356 through 360 are read as the 1st, 2nd, 3rd, 4th and 5th digits in a binary system and equal to zero when de-energized and one when energized the correspondingly numbered solenoid will be energized. For example, if relays 356, 358 and 360 only are energized the binary number represented is 10101 which is reading from right to left $$(1)(2^0)+(0)(2^1)+(1)(2^2)+(0)(2^3)+(1)(2^4)$$

in the decimal system and equal to 21.

Relay 356 is energized and this places armature 362 in contact with contact 364. Relay 357 is de-energized and armature 367 which is connected to contact 364 and in contact with contact 372 connects one side of solenoid S21 to the power supply. Relay 358 is energized and armature 377 engages contact 386 which is connected to the other side of solenoid S21. Armature 377 is connected to contact 393 of switch 390 which is unaffected since relay 359 is not energized and armature 388 is connected to contact 398 of switch 396. A complete circuit is made to ground through armature 395 since it is urged into engagement with contact 398 when relay 360 is energized.

When relays 356, 358 and 360 only are energized the only complete circuit between the power supply and ground is through solenoid S21 which energizes the solenoid and causes its actuator 319 to rise and engage the detent of the holder which is positioned in the bay above it and movemnt of the holder to the printing position is as previously described. After an up-date is completed the output from flip-flop 244, shown in FIGURE 5, resets register 350 and returns the armatures to the positions shown in the drawings in which positions no solenoids are energized.

Switching matrix 217 of FIGURE 5 may be identical to selector 220 with the omission of the solenoids. However, in the interest of speed the mechanical switches and their operating relays may be replaced by electronic switches operated by the outputs from register 350.

In FIGURE 12 the complete mechanical layout of the character selection mechanism is shown along with the detectors and the brakes which sense the correct position of the character which is to be printed and stop the selection mechanism respectively. The layout is in isometric with the support and covering structure removed so that the details of the mechanism will not be obscured. Furthermore the structure is viewd from the upper left hand corner of the device as shown in FIGURE 1. This particular viewpoint was necessary to clearly illustrate the operation of the braking mechanism and the detectors.

Motor 226 which drives the character selection mechanism has a pinion gear 400 keyed to its shaft 401 and pinion gear 400 meshes with and drives a drive gear 402 which supplies motive power to pulley 6 through a slip or overload clutch 403. Clutch 403 is connected to gear 402 by a shaft 404 and to pulley 6 by a shaft 405.

Pulley 6 has three parts. It has a central portion 407 which is keyed to shaft 405 and which bears sprocket teeth 9 which drive the tape 7. The relieved portions 13 in which the characters 8 nest are formed in the central portion 407. It also has two identical outer portions 408 and 409 which rotate freely on shaft 405 and support the outer edges of tape 7 to provide proper tape tension for smooth movement of the tape.

Pulley 11 is identical to pulley 6 and has its central portion which is not visible keyed to a shaft 411. The motion of pulley 6 is transmitted through the tape 7 to pulley 11, and shafts 405 and 411 rotate together in synchronism. Four identical brake wheels 412, 413, 414 and 415 each having a plurality of notches 416 are keyed to shaft 411. The wheels are phased so that the notches on the successive wheels will when the shaft is rotated pass any given fixed point which is similar for each wheel successively and the notch on the fourth wheel will pass the selected point before the next suceeding notch on the first wheel passes the point. Thus, assuming the points to lie on a line parallel to the axis of shaft 411 a notch on the first wheel 412 will pass the line and in order notches on the second 413, third 414, and fourth 415 wheels will pass before the next notch on wheel 412 passes the line. This sequence will be repeated for each succeeding notch on each of the wheels until the shaft is stopped. How the shaft is stopped will be described later.

Four identical counting wheels 420, 421, 422 and 423 each having plurality of alternate transverse lands 425 and grooves 426 on the periphery of the wheels are keyed to shaft 411. Here again the grooves on the wheels are phased in the same manner as the notches on wheels 412 through 415, inclusive. Brake wheel 412 and counter wheel 420 constitute a pair and cooperate with each other to control character positioning for those up-dates which are to be printed on the first line of any strip. Wheels 413 and 421 constitute a pair and control positioning for up-dates which are to be printed on the second line, and wheel pairs 414 and 422, and 415 and 423 control the positioning for lines three and four, respectively.

Four identical microswitches 427, 428, 429 and 430 are positioned adjacent to counter wheels 420, 421, 422, and 423, respectively. Each microswitch has an actuator 431 which is in rolling contact with the periphery of its associted counter wheel and the associated microswitch is closed whenever the actuator engages a land on its associated wheel and open when it engages a groove. The microswitch are connected to a power supply and selector 228 which, depending on which line the up-date is to be printed, connects the correct microswitch output to counter 234. That is, if the up-date is to be printed on line one the pulses from microswitch 427 will be applied to count down counter 234. For line 2 microswitch 428 will be connected to counter 234 and for lines 3 and 4 switches 429 and 430, respectively, will be connected to counter 234.

Four identical solenoids 433, 434, 435 and 436 are positioned adjacent brake wheels 412, 413, 414 and 415, respectively. Each solenoid has a plunger 437 which is biased away from the solenoid by a spring not shown in this figure. The plunger 437 will be moved toward the solenoid when the solenoid is energized. This condition is shown in the case of solenoid 433 and its associated plunger 437 is displaced toward the solenoid. Four identical fingers 438 are pivotally mounted at their centers, on a shaft 439. A plurality of spacer bushings 440 are provided to maintain fingers 438 in predetermined locations opposite their associated brake wheel. Each finger is attached to its associated plunger at its lower end and bears a bushing 441 at its upper end which when its associated solenoid is energized go into rolling contact with the periphery of its associated brake wheel and drop into the first notch it encounters. When a bushing drops into a notch shaft 411 will be braked and tape 7 will stop. The shaft will be free to rotate when the solenoid is de-energized since the spring which biases plunger 437 will remove the bushing from the notch.

A gear 443 is keyed to shaft 411 and meshes with and drives another gear 444 which is keyed to the shaft of limit detector 247. As was previously described detector 247 emits a pulse when motor 226 and the drive train which includes tape 7 is returned to its rest or zero position. This pulse is applied to the motor control switch 226*a* to de-energize the motor and stop the tape 7 in its zero position. Also shown in FIGURE 12 is the motor 445 which drives the inked ribbon 14 which was described earlier.

FIGURES 14 and 15 show brake wheel 412 and its associated solenoid 433 in its "on" and "off" condition, respectively. The spring 446 which withdraws bushing 441 from the notch when the solenoid is de-energized is shown in its contracted condition in FIGURE 14 and in its expanded position in FIGURE 15 which occurs when the solenoid is energized.

In FIGURE 13 selector 228 and its interconnections with the microswitches and the solenoids shown in FIGURE 12 are illustrated. Static register 205 contains the line information on two elements. This information is read in the following manner. If the up-date is to be printed on line 1 neither element provides an output, i.e., both are in the zero state. If the up-date is to be printed on line two then the first element will provide an output, i.e., a one and the second none, i.e., zero. For the third line element one is zero and element two is a one and for the fourth line both elements provide an output. The output from the first element is applied to a relay circuit 450 and the second to another relay circuit 451.

Relay 450 is mechanically coupled to the armatures 452, 453, 454, 455 of a DPDT switch 456 and relay 451 is mechanically coupled to the armatures 457 and 458 of a SPDT switch 459. Both switches are illustrated in their normal or de-energized state with armatures 452, 453, 454, and 455 engaging contacts 460, 461, 462 and 463, respectively. When relay 450 is energized armatures 452, 453, 454 and 455 are actuated and they engage contacts 465, 466, 467 and 468, respectively. Armatures 457 and 458, in the de-energized state of relay 451, engage contacts 469 and 470, respectively. When relay 451 is energized armatures 457 and 458 are moved into engagement with contacts 471 and 472, respectively. Armatures 457 and 458 are connected through a terminal 473 to a power supply which is not shown.

Solenoids 433, 434, 435 and 436 have one side connected to an "and" gate 475 which is connected to ground. Flip-flop 230 is also connected to the "and" gate and opens the gate when it is set to thereby connect the solenoids to ground.

One side of each of microswitches 427, 428, 429 and 430 is connected to a power supply not shown through a terminal 477 and the other side of each microswitch is connected to counter 234 by normally open relay operated switches 478, 479, 480 and 481, respectively.

When the up-date is to be printed on line one relays 450 and 451 are de-energized and power from terminal 473 is applied through armature 457, contact 469, armature 452 and contact 460 to a relay coil 483 which closes normally open switch 478. When switch 478 is closed pulses of electrical energy are applied as previously described via microswitch 427 and switch 478 to count down counter 234. Simultaneously power from terminal 473 is applied through armature 458, contact 470, armature 454 and contact 462 to solenoid 433. However, the solenoid will not be energized until the count down previously referred to has been completed and flip-flop 230 has been set since gate 475 will remain closed until flip-flop 230 is set. Once the flip-flop is set the gate is closed and the solenoid 433 is energized. With the energization of the solenoid the further movement of the tape which bears the characters is prohibited as previously described.

When an up-date is to be printed on line two relay 450 will be energized and relay 451 de-energized and power from terminal 473 will be applied through armature 457, contact 469, armature 460 and contact 465 to a relay coil 484 which closes normally open switch 479. When switch 479 is closed pulses of electrical energy are applied via microswitch 428 to count down counter 234. Here again power from terminal 473 is simultaneously applied through armature 458, contact 470, armature 454 and contact 467 to solenoid 434. As previously described the solenoid will not be energized until the count down of counter 234 has been completed and flip-flop 230 set. When line three is to be up-dated relay 451 only is energized and solenoid 435 is connected to the power supply through terminal 473. If line four is to be up-dated both relays 450 and 451 are energized and solenoid 436 will be connected to terminal 473. In the case of an up-date to line three the power supply is also connected to a relay coil 485 which closes normally open switch 480 to connect microswitch 429 to counter 234, and in the case of an up-date on line four the power supply is connected to a relay 486 which closes normally open switch 481 to connect microswitch 430 to counter 234.

In FIGURE 16 an enlargement of the central right hand portion of the console unit is shown in isometric with the cover 2 broken away to reveal the details of the holder locking device and portions of the depression mechanism which imprints the character on the strip after the character belt and the strip have been positioned in accordance with the up-date which is being processed.

A support rail 500 extends from the top to the bottom of the bay and with an identical unit located on the opposite side of the bay supports the units 3 which are not shown in this figure. The strip holder bases are supported by unit 3 and lateral movement of the strip holder bases is prevented by a raised portion 501 on the support rails 500. The right hand support rail which is illustrated has a plurality of pins 502 mounted thereon. Each holder position has one pin mounted opposite the funnel shaped termination 39 of channel 38 which is illustrated in FIGURE 2. With this arrangement vertical movement of the holder is restricted when the movable portion of the holder is displaced to the right for printing since the pin 502 is in engagement with channel 38.

A right angle depression bar 504 with a resilient coating 505 on its upper surface extends from the top to the bottom of the bay and is pivotally connected to rail 501. Bar 504 is located directly under an inverted U shaped channel 506 formed in the cover 2. Tape 7 is located between the two side walls 507 of channel 506 and is spaced from the bottom by an oval shaped resilient strip 508 which extends the entire length of the channel. The maximum thickness of oval shaped strip 508 is such that characters 8 extend below side wall 507. Thus when depression bar 504 is urged upward a holder which has been displaced to the printing position will contact inked ribbon 14 and character 8 which will cause character 8 to be imprinted on the strip located on the movable portion of the holder. Furthermore, side walls 507 will when the holder is in the printing position prevent the upward movement of the holder to lock it in place in cooperation with pin 502, channel 38 and raised portions 501 of rail 500.

The brackets 510 spaced from each other extend outwardly from bar 504 and support between them a connecting rod 511 which is supported on a pin 512 extending between the brackets. The other end of connecting rod 511 is slidably mounted on one part of a stepped eccentric bushing 514 which has two cylindrical surfaces 515 and 516 having different radii. The bushing is keyed to a drive shaft 517 which is driven by a drive gear 518. Thus, on each revolution of drive gear 518 connecting rod 511, brackets 510 and bar 504 are driven upwards and then down. If a character is located over an extended holder that character will be imprinted on the strip mounted on the holder.

Shaft 517 has a cam wheel 520 mounted on its free end which as two surfaces of different radii defining its periphery. The bearing structure for supporting shaft 517 has not been shown since it would have hidden portions of the depression drive mechanism but the bearing structure is conventional in all respects and need not be illustrated.

The remainder of the depression drive mechanism is shown in FIGURE 17. Here again support structure has been omitted to facilitate the explanation of the mechanism. Bar 504 is pivotally connected to a support boss 522 which extends from rail 501. The connection is made through a hinge pin 523 and a support member 524 rigidly attached to the bar 504. The output shaft 526 of depression motor 239 has a pinion 527 attached thereto. Pinion 527 meshes with and drives a gear 528 which is mounted on a shaft 529. Shaft 529 is connected to one side of clutch 238 and the other side of clutch 238 is connected to another pinion gear 530 through a shaft 531. Pinion gear 530 in turn meshes with and drives the drive gear 518.

A microswitch 532 is positioned adjacent cam wheel 520 and has an actuater 533 which is in rolling contact with the face of the wheel. Microswitch 532 is closed every time the face having the larger radius is in engagement with the actuater 533 and open when in engagement with the face having the smaller radius. Cam wheel 520, microswitch 532 and actuater 533 comprise the detector 240 described in FIGURE 5. It is obvious that for each revolution of shaft 517 one pulse will be emitted when microswitch 532 is connected to a power supply. It is this pulse which de-energizes clutch 238 to prevent further rotation of shaft 517 and multiple depressions.

FIGURE 18 is a detailed block diagram of distributor 202 shown in FIGURE 5. The computer 200 provides seven parallel bits on seven conductors. An "and" gate 540 is interposed between the parallel conductors from the computer and registers 203 through 209 inclusive. The computer also provides clock pulses which are also transmitted through gate 540. When gate 540 is open, the clock pulses are applied to a ring counter 541 and the seven parallel lines from the computer which pass through gate 540 when it is open are applied in parallel to each of seven "and" gates 542 through 548, inclusive. The outputs of gates 542 through 548, inclusive, are connected to registers 203 through 209, inclusive.

Ring counter 541 has 8 stages. The first state is connected to gate 542 and when an output is provided from this stage, gate 542 is opened and the first group of seven parallel bits from the computer are applied to register 203. When the second stage of ring counter 541 provides an output, gate 543 is opened and the second group of seven parallel bits from computer 200 are applied to register 204. The third stage opens gate 544 and applies the third group of seven parallel bits for computer to register 205. The fourth, fifth, sixth, and seventh stages open gate 545, 546, 547 and 548, respectively, to apply the fourth, fifth, sixth and seventh groups of seven parallel bits to registers 206, 207, 208 and 209, respectively.

The eighth stage of the ring counter 541 is applied to a reset input of a flip-flop 550. The set input of flip-flop 550 is connected to flip-flop 244 which is also shown in FIGURE 5. Thus, when flip-flop 244 is set to indicate the completion of an up-date, it in turn sets flip-flop 550 which opens gate 540 since the output of flip-flop 550 is connected to gate 540 and opens that gate. The output from the eighth stage resets flip-flop 550 which closes the gate 540 after a complete up-date has been entered in registers 203 through 209, inclusive.

FIGURE 19 is a detailed block diagram of stepping switch 233 which is shown in FIGURE 5. The pulses from detector 240 are applied through an "or" gate 560 to a six-stage ring counter 561. These pulses step the ring counter 561 along. The output from the first stage of the ring counter is applied to an input of an "and" gate 563. The other input of "and" gate 563 is connected to the output of "and" gate 218. Thus, the holder position as indicated by the output from counuter 216 is applied through "and" gate 563 and an "or" gate 564 to counter 234 when the first stage of ring counter 561 provides an output. Counter 234 is counted down as previously described and detector 240 provides a pulse after depression and printing which steps ring counter 561 to the second stage.

The output from the second stage of ring counter 561 is applied to the input of another "and" gate 566. The output of register 206 is also applied to the input of "and" gate 566 and the contents of register 206 are transmitted through "or" gate 564 to counter 234 when the second stage of ring counter 561 provides an output. Again counter 234 is counted down and detector 240 supplies another pulse after depression and printing which steps ring counter 561 along to its third stage.

The output from the third stage of ring counter 561 is applied to an input of an "and" gate 567. The other input of "and" gate 567 is connected to the output of register 207 and whenever the third stage of the ring counter provides an output, the differential character position contained within register 207 is applied through "and" gate 567 and "or" gate 564 to counter 234. The character position information contained within register 207 is in the nature of a differential and, therefore, a portion of this information contains the sign which indicates the direction in which the belt is to be driven. This portion of the information is applied to an "and" gate 568 along with the output from the third stage of ring counter 561 and transmitted through gate 568 and an "or" gate 569 to conductor 242. Counter 234 is counted down and after depression detector 240 provides yet another pulse through "or" gate 560 which steps ring counter 561 along to its fourth stage.

The output from the fourth stage of the ring counter is applied to an input of an "and" gate 570 and an "and" gate 571. The other inputs of "and" gates 570 and 571 are connected to register 208 which is similar to register 207 and contains the differential information relative to the third character. Gate 570 is connected through "or" gate 564 to counter 234 and gate 571 is connected through "or" gate 569 to conducor 242. Here again after counter 234 has been counted down and the depression completed, detector 240 supplies another pulse through "or" gate 560 which steps ring counter 561 along to its fifth stage.

The output from the fifth stage is applied to an input of "and" gates 573 and 574. The other inputs of "and" gates 573 and 574 are connected to register 209 which contains differential information relative to the fourth and final character of the up-date. "And" gate 573 is connected through "or" gate 564 to counter 234 and "and" gate 574 is connected through "or" gate 569 to conductor 242. After the differential information relative to the fourth character has been inserted in counter 234 and the count down and depression have been completed, detector 240 supplies a pulse through gate 560 which steps ring counter 561 along to its sixth stage.

The output from the sixth stage is applied through an "and" gate 575, which has its other input connected to a power supply not shown via a terminal 576, to the set input of flip-flop 244. The output from "and" gate 575 is also applied through "or" gate 560 to ring counter 561 to step it along to its original and starting position with an output on stage one. Thus, stepping switch 233 is ready to handle the next up-date.

Motor control switch 226*a* shown initially in FIGURE 5 is shown in detail in FIGURE 20 along with motor 226, limit switch 247 and flip-flop 244. Limit switch 247 is connected to the set input of a flip-flop 580. The output of flip-flop 580 when it is set, is connected to a relay coil 581 which opens a normally closed DPST switch 582. Switch 582 has two armatures 583 and 584 which in the normal position engage a pair of contacts 585 and 586, respectively. The contacts are connected to the terminals of an alternating supply voltage source 587.

The output from the flip-flop 244 and the output in conductor 242 are applied through an "or" gate 588 to a relay coil 590 which is mechanically coupled to two DPST switches 591 and 592. Switch 591 is shown in its normally open position and switch 592 is shown in its normally closed position. When an output from either flip-flop 244 or conductor 242 is applied to the relay coil 590 through gate 588, the switch armatures 594 and 595 of switch 591 are moved into engagement with contacts 596 and 597, respectively. The switch armatures 598 and 599 of switch 592 are simultaneously moved out of engagement with contacts 600 and 601, respectively, of switch 592. Contacts 596 and 600 are connected to armature 583 and contacts 597 and 601 are connected to armature 584. Armatures 598 to 599 when in engagement with contacts 600 and 601, respectively, energize motor 226 such that its rotation will be in the forward direction and armatures 594 and 595 when in engagement with contacts 596 and 597, respectively, energize the motor 226 such that its rotation will be reversed.

When an up-date is completed and motor 226 has returned to its zero or rest position, limit switch 247 sets flip-flop 580 which energizes relay coil 581 and opens the supply circuit of motor 226 which prevents its further rotation. Flip-flop 580 remains set and motor 226 remains de-energized until a successful comparison in comparator 211 has been made which will set flip-flop 214 to provide an output on conductor 214*a* which output is applied to the reset input of flip-flop 580. When flip-flop 580 is reset, relay coil 581 is de-energized, armatures 583 and 584 engage contacts 585 and 586, respectively, to connect motor 226 to source 587. The direction of rotation will be determined as previously described. However, at the beginning of an up-date neither conductor 242 nor flip-flop 244 can provide an output and motor 226 will be driven in the forward direction. The motor control switch just described for motor 226 may be substituted for the motor control switch 221*a* used with motor 221 by merely eliminating the connection from conductor 242.

Comparator 211 of FIGURE 5 is shown in detail in FIGURE 21. The comparator comprises seven identical units 610, only one of which is shown in detail, connected through a resistor 611 to a negative power supply 612. Each of the units 610 is also connected to an amplifier 614 having an output conductor 213. Output conductor 213 is the same conductor shown in FIGURE 5 connected to gate 218. Unit 610 will provide a negative potential to the input of amplifier 614 whenever the two inputs of a given unit are identical; for example, if both are positive or both negative. However, should one of the seven units not have identical inputs, that unit would, by itself, make the input potential of amplifier 614 positive in which event the amplifier would provide no output on its output conductor 213.

Each of units 610 has a pair of input terminals 616 and 617. Terminal 616 of the first unit is connected to the first vertical column of the core matrix as shown in FIGURE 4. Terminal 617 is connected to the first stage of the holder code register 203. Terminals 616 of units 2, 3, 4, 5, 6 and 7 are connected to the second, third, fourth, fifth, sixth and seventh vertical columns of the core matrix, respectively, and terminals 617 of the second, third, fourth, fifth, sixth and seventh units are connected to the second, third, fourth, fifth, sixth, seventh, stages of holder code register 203, respectively. Terminals 616 and 617 are connected by identical resistors 619 and 620 to the base 621 of a transistor 623.

The emitter 624 of transistor 623 is connected to ground. The base 621 is connected to a resistor 626 whose opposite terminal is connected to a positive source of voltage 625. The collector 628 of transistor 623 is connected to a terminal 629. Terminals 616 and 617 are also connected to a terminal 630 by two diodes 631 and 632 respectively.

A resistor 634 is connected between voltage source 625 and another terminal 635 and a pair of diodes 637 and 638 are connected between terminal 635 and terminals 629 and 630, respectively. A pair of resistors 640 and 641 are connected between negative voltage source 612 and terminals 629 and 630, respectively.

The input of amplifier 614 is connected to terminal 635 by a diode 643. Terminals 616 and 617 are, at all times, either negative or positive. Whenever terminals 616 and 617 are both negative or both positive, the voltage at terminal 635 is sufficiently negative to render amplifier 614 operative, provided each and every terminal 635 in the seven units is also negative. Whenever terminals 616 and 617 are dissimilar, that is, one is negative and the other positive, the voltage at terminal 635 rises to such a voltage as to prevent amplifier 614 from providing an output on conductor 213.

Resistors 640 and 641 are identical and are substantially smaller than resistor 611 so that the parallel circuit comprising resistors 611 and 640 or 641 has a total resistance which is less than 640 or 641. Thus, the voltage at terminal 635 is a function of the resistance between terminals 635 and source 612. When terminals 616 and 617 are similar, that is both positive or negative, either diode 637 or diode 638 will conduct, thus placing either resistor 640 or 641 in parallel with resistor 611. When the terminals are disimilar, neither diode 637 nor diode 638 conducts and the resistance between terminal 635 and source 612 is equal to the value of resistance 611 which is much larger than the parallel resistance of 611 and 640 or 641 which results in a large voltage drop across resistor 611 to make the potential of terminal 635 much more positive than in the previous case.

When terminals 616 and 617 are dissimilar, a negative voltage is applied to the base 621 which causes transistor 623 to conduct, making terminal 629 positive which back biases diode 637 and prevents conduction therethrough. The positive input through either diode 631 or 632 makes terminal 630 positive, which in turn, back biases diode 638 and prevents conduction therethrough. It is obvious from the foregoing that dissimilar inputs acting through both transistors 623 and diode 631 or 632 will put only resistor 611 between terminal 635 and source 612. However, when both inputs to terminals 616 and 617 are the same, only one diode of the pair 637 and 638 will be back biased. Thus, the total resistance between terminals 635 and source 612 will be the parallel combination of resistor 611 and 640 or 641.

FIGURE 22 shows the electrical connections of the switch buttons 20 referred to in FIGURE 1. Each button comprises a switch 650 having an armature 651 and a contact 652. The cover of the switch button also includes a lamp 653 which is illuminated whenever the button is actuated and armature 651 moved into engagement with contact 652.

The contact 652 of switch 650 located in the first holder position is connected to the $T_1$ scanning bit from switch matrix 217 and the remaining contacts 652 are connected to the succeeding T bit outputs from switch matrix 217. The lamps 653 associated with the switches 650 also have one side connected to the same T bit output from switch matrix 217. The other side of each lamp is connected to a common bus 655 by a diode 656. The armatures 651 of the switches 650 are connected to another bus 658. Bus 658 is connected to the input of a lamp amplifier and driver circuit 659 and the output of amplifier 659 is connected to bus 655. Whenever a switch button is depressed, the armature 651 associated with that button is moved into engagement with its associated contact 652. This connects the T bit connected to contact 652 to the input of lamp driver amplifier 659. The output of lamp driver amplifier 659 forward biases diodes 656 which causes the lamp 653 associated with the depressed switch to be illuminated.

The matrix of cores 41 and their associated windings are shown in block form connected to the appropriate T bit outputs from switch matrix 217. The first horizontal row of cores and associated windings are connected to the first T bit output and each succeeding horizontal row is connected to a succeeding T bit output from switch matrix 217.

The vertical columns are shown connected in series and applied to an "and" gate 660 which is operated by the lamp driver amplifier 659. Whenever the lamp driver amplifier is connected to a T bit output through an armature 651 and contact 652, the output from the vertical columns of the scanning matrix is applied through gate 660 to a buffer 662.

A keyboard 663 is also connected to buffer 662 and coded information may be inserted into the buffer by depressing preselected keys. The keyboard 663, in addition to the information channel connected to buffer 662, provides two additional outputs which are manually generated. By selecting the proper key an output may be supplied to buffer 662 which will clear the buffer and wipe out all of the information contained therein. The other input which may also be generated by depressing an enter key supplies an output to a gate 665 which permits the passage of information contained in buffer 662 to the computer 200.

*Operation*

A bay is placed in operation by turning on all of the necessary power supplies of the various devices previously described. Holders which have been loaded with strips are arranged in the bay one on top of the other so that the holders touch each other and rest upon each other from the bottom towards the top.

If it is desired to have two operating groups of holders, a bay spacer may be inserted and a second group stacked above the bay spacer. One or more than one bay spacer may be used to provide two or more groups of holders. When a holder is loaded, the identified fix point and aircraft identification are transmitted with the holder code to the computer. Thus, the computer will address up-date messages for that particular aircraft and fix point to the holder code thus associated therewith.

The up-dates for holders contained in the bay are supplied to the distributor which accepts one up-date at a time for processing. The up-date contains seven groups of seven parallel bits. The first group of bits contain the holder code being addressed. These are inserted in the holder code register and compared with the output from the bay scanner, which serially provides the holder codes of the holders located in the bay starting with the lowermost holder and moving up the bay to the upper-most holder and then back again to the lowest.

When a successful comparison is made, an output is developed which provides a digital indication of the bay position of that holder which successfully compares with the holder code in the up-date.

The second group of bits indicates on which of the columns available on the strip mounted in the holder the up-date is to be printed. The second group of bits are applied to a column register which controls a motor which displaces the selected holder to a printing position. When the holder has arrived at the correct printing position, a signal is developed which stops the motor and partially enables the actual printing operation. The printing operation will be completely enabled when the proper character has been selected.

The third group of bits determine the line on which the up-date will be printed. These bits are inserted in a line register, the output of which controls the braking of the print mechanism motor. This is, the motor which drives the character bearing tape will be stopped to position a preselected character over the correct line.

A fourth, fifth, sixth and seventh group of bits determine, respectively, the first, second and third and fourth characters of the up-date.

The positional information previously referred to as being developed when a successful comparison has been made, is applied to the character belt motor to bias the zero belt position so as to compensate for the positional deviation of the holder from the first holder position. This places the zero belt position which is a blank over the correct line of the correct holder. When this has been accomplished, depression is enabled and the blank is printed if the circuit of FIGURE 5 is used. Sequentially, the information in the first character register is then applied to the belt motor to position the first character of the up-date over the correct line of the strip and the information in the second, third and fourth character registers are likewise applied. After the last character has been printed, the holder which has been updated is moved back to its normal position in the bay and the character tape is moved back to its zero position. This renders the unit ready to accept the next up-date which is processed in the same manner.

While generally only one embodiment of the invention has been described and shown in detail for illustration purposes, it should be obvious that the invention has many applications and that it may take different forms without departing from the scope of the invention. It is, therefore, to be expressly understood that the invention is not to be limited to the specific embodiment shown.

What is claimed is:

1. A data processing and display system comprising a plurality of mediums for recording information in a permanent form, a plurality of uniquely coded holders for supporting each of said mediums, a source of information-bearing signals containing at least one of said unique codes, means for scanning the uniquely coded holders and for comparing the scanned holder codes with coded portion of the information-bearing signals, said scanning means including a plurality of magnetic cores, said cores being arranged in a rectangular matrix composed of columns and rows, each of said cores having two substantially symmetric magnetic circuits which share one common element and each having at least one non-common element, said non-common elements being oppositely arranged so that a similar change in flux in both magnetic circuits produces equal and opposite effects in the non-common elements, means for connecting all of the non-common elements in each column in series, means for connecting the common elements in each row in series, distinctively coded means arranged in each row to magnetically alter the characteristics of preselected magnetic circuits in preselected columns, means for applying successive pulses to the series connected common elements in successive rows, means connected to the series connected elements in the columns for comparing the outputs from the columns with a predetermined coded electric signal and means for recording the additional information contained in said information-bearing signals on that medium which is mounted on the uniquely coded holder which compares with the coded portion of the information-bearing signals.

2. A data processing and display system comprising a plurality of mediums for recording information in a permanent form, a plurality of uniquely coded holders for supporting each of said mediums, a source of information-bearing signals containing at least one of said unique codes, means for scanning the uniquely coded holders and for comparing the scanned holder codes with coded portion of the information-bearing signals, said scanning means including a plurality of E shaped magnetic cores arranged in a rectangular matrix which forms a plurality of columns and rows each of said cores having oppositely orientated windings on the outer legs of the E shaped cores, the windings on the outer legs in each column being connected in series, said center legs also having a winding and the windings on the center legs in each row being connected in series, distinctively coded means arranged in each of the rows, said coded means including an array of magnetic material arranged to overlie one outer leg and the center leg of preselected cores, means for successively applying electric pulses to the series connected rows, means connected to the series connected columns for comparing the electric outputs from the columns with a predetermined coded electric signal and means for recording the additional information contained in said information-bearing signals on that medium which is mounted on the uniquely coded holder which compares the coded portion of the information-bearing signals.

3. A data processing and display system comprising a plurality of mediums for recording information in a permanent form, a plurality of uniquely coded holders for supporting each of said mediums, a source of information-bearing signals containing at least one of said unique codes, means for scanning the uniquely coded holders and for comparing the scanned holder codes with coded portion of the information-bearing signals, said scanning means including a plurality of magnetic cores arranged in a rectangular matrix which forms a plurality of columns and rows, each of said cores having three windings, two of said windings being opposite in sense, means connecting the oppositely wound windings on all of those cores lying in a column in series and means connecting said other windings on all of those cores lying in a row in series, distinctively coded means arranged in each row, said coded means comprising magnetic material arranged to overlie preselected coils on said cores, means for successively applying electric pulses to the series connected rows, and means connected to the series connected columns for comparing the electric outputs from the columns with a predetermined coded electric signal and means for recording the additional information contained in said information-bearing signals on that medium which is mounted on the uniquely coded holder which compares the coded portion of the information-bearing signal.

4. A data processing and display system comprising a plurality of mediums for recording information in a permanent form, a plurality of uniquely coded holders for supporting each of said mediums, a source of information-bearing signals containing at least one of said unique codes, means for sequentially scanning the uniquely coded holders and providing electric outputs corresponding to the codes thereon, said sequential scanning means including a plurality of magnetic cores, said cores being arranged in a rectangular matrix comprised of a plurality of columns and rows, each of said cores having two substantially symmetric magnetic circuits which share one common element and each having at least one non-common element, said non-common elements being oppositely arranged so that a similar change in flux in both magnetic circuits produces equal and opposite effects in the non-common elements, means for connecting all of the non-common elements in each column in series, means for connecting the common elements in each row in series, distinctively coded means arranged in each row to magnetically alter the characteristics of preselected magnetic circuits in preselected columns, means for applying successive pulses to the series connected common elements in the columns, means for comparing the outputs from the columns with a predetermined coded electric signal, means for comparing the scanner outputs with the coded portion of the information-bearing signals and for providing an output whenever the scanner output and the coded portion of the information-bearing signals correspond, and means responsive to the scanning means output and the comparator output for recording the additional information contained in said information-bearing signals on that medium which is mounted on the uniquely coded holder whose code corresponds with the coded portion of the information-bearing signals.

5. A data processing and display system comprising a plurality of mediums for recording information in a permanent form, a plurality of uniquely coded holders for supporting each of said mediums, a source of information-bearing signals containing at least one of said unique codes, means for sequentially scanning the uniquely coded holders and providing electric outputs corresponding to the codes thereon, said sequential scanning means including a plurality of E shaped magnetic cores arranged in a rectangular matrix which forms a plurality of columns and rows each of said cores having oppositely orientated windings on the outer legs of the E shaped cores, the windings on the outer legs in each column being connected in series, said center legs also having a winding and the windings on the center legs in each row being connected in series, distinctively coded means arranged in each of the rows, said coded means including an array of magnetic material arranged to overlie one outer leg and the center leg of preselected cores, means for successively applying electric pulses to a series connected rows and means connected to the series connected columns for comparing the electric outputs from the columns with a predetermined coded electric signal, means for comparing the scanner outputs with the coded portion of the information-bearing signals and for providing an output whenever the scanner output and the coded portion of the information-bearing signals correspond, and means responsive to the scanning means output and the comparator output for recording the additional information contained in said information-bearing signals on that medium which is mounted on the uniquely coded holder whose code corresponds with the coded portion of the information-bearing signals.

6. A data processing and display system comprising a plurality of mediums for recording information in a permanent form, a plurality of uniquely coded holders for supporting each of said mediums, a source of information-bearing signals containing at least one of said unique codes, means for sequentially scanning the uniquely coded holders and providing electric outputs corresponding to the codes thereon, said sequential scanning means including a plurality of magnetic cores arranged in a rectangular matrix which forms a plurality of columns and rows, each of said cores having three windings, two of said windings being opposite in sense, means connecting the oppositely wound windings on all of those cores lying in a column in series and means connecting said other windings on all of those cores lying in a row in series, distinctively coded means arranged in each row, said coded means comprising magnetic material arranged to overlie preselected coils on said cores, means for successively applying electric pulses to the series connected rows, and means connected to the series connected columns for comparing the electric outputs from the columns with a predetermined coded electric signal, means for comparing the scanner outputs with the coded portion of the information-bearing signals and for providing an output whenever the scanner output and the coded portion of the information-bearing signals correspond, and means responsive to the scanning means output and the comparator output for recording the additional information contained in said information-bearing signals on that medium which is mounted on the uniquely coded holder whose code corresponds with the coded portion of the information-bearing signals.

7. A data processing and display system comprising a plurality of mediums for recording information in permanent form, an array comprising a plurality of uniquely coded holders each supporting an individual medium, a source of information-bearing signals including in addition to said information one of said unique codes, means for sequentially scanning the array of uniquely coded holders and providing sequential electric outputs which correspond to the codes thereon, means for comparing the scanner outputs with the coded portion of the information-bearing signals and for providing an output indicative of the location in the array of the holder whose code corresponds to the coded portion of the information-bearing signals, a moveable type bearing means located adjacent said coded holders, a first motor responsive to the output from said comparator for displacing the holder whose code compares with the coded portion of the information-bearing signal into operable association with the moveable type bearing means, a first detector responsive to the movement of said first motor for providing electric signals corresponding to the movement of the first motor, said information-bearing signals including a first portion indicative of the total displacement required of the holder displaced, first comparator means connected to the first detector and the first portion of the information-bearing signals for providing an output when the detector output and the first portion of the signals correspond, a first brake means connected to the first motor and arranged to prevent further movement of the first motor whenever the detector output and the first portion of the information-bearing signals correspond, a second motor connected to the moveable type bearing means for causing said means to move in a preselected direction, a second detector connected to the second motor for providing electric signals indicative of the extent of the motor movement, said information-bearing signals including a second portion or indicating the total required movement of the second motor, a second comparator means connected to the second detector and the second portion of the information-bearing signals for providing an output whenever the second detector output and the second portion of the information-bearing signals correspond, a second brake means connected to the second motor and arranged to prevent further movement of the second motor whenever the output from the second detector and the second portion of the information bearing signals correspond, and means responsive to the first and second comparator means for actuating said moveable type bearing means to imprint a preselected character on the medium mounted on the displaced holder.

8. A data processing and display system comprising a plurality of mediums for recording information in a permanent form, a plurality of uniquely coded holders for supporting each of said mediums, a source of information-bearing signals including in addition to said information one of said unique codes, means for scanning the coded holders, said means including a plurality of cores arranged in a rectangular matrix forming a plurality of columns and rows adjacent said holders, each of said cores having two oppositely arranged but otherwise substantially symmetric magnetic circuits which share one common element and have at least one element each which is not common to the other, means for connecting all of the non-common elements in each column in series, means for connecting the common elements in each row in series, said holders being arranged in each row such that each holder magnetically alters the characteristics of preselected magnetic circuits in the row occupied by the holder, means for applying successive pulses to the series connected common elements in the successive rows, means connected to the series connected elements in the columns for comparing the successive outputs from the columns with the coded portion of the information-bearing signals and for supplying an output when the outputs from the columns and the coded portion of the information-bearing signals correspond, a moveable type bearing means located adjacent to the holders, a first motor responsive to the output from the means connected to the columns of the scanning device for displacing a preselected holder into operable association with the moveable type bearing means, a first detector responsive to the movement of said first motor for providing electric signals corresponding to the movement of the first motor, said information-bearing signals including a first portion indicative of the total displacement required of the holder to be displaced, first comparator means connected to the first detector and the first portion of the information-bearing signals for providing an output when the detector output and the first portion of the signals correspond, a first brake means connected to the first motor and arranged to prevent further movement of the first motor whenever the detector output and the first portion of the information-bearing signals correspond, a second motor responsive to the output from the means connected to the scanning device for operating said moveable type bearing means and causing said means to move in a preselected direction, a second detector connected to the second motor for providing electric signals indicative of the extent of the second motor movement, said information-bearing signals including a second portion for indicating the total required movement of the second motor, a second comparator means connected to the second detector and the second portion of the information bearing signals for providing an output whenever the second detector output and the second portion of the information-bearing signals correspond, a second brake means connected to the second motor and arranged to prevent further movement of the second motor and the moveable type bearing means whenever the output from the second portion of the information-bearing signals correspond, and means responsive to the first and second comparator means for actuating said moveable type bearing means to imprint the preselected character on the medium which is mounted on the displaced holder.

References Cited by the Examiner

UNITED STATES PATENTS

| | | | |
|---|---|---|---|
| 1,513,215 | 10/24 | Betts | 346—48 |
| 2,338,180 | 1/44 | Harrison | 346—48 |
| 2,431,651 | 11/47 | Spencer | 346—33 |
| 2,620,256 | 12/52 | Kerns et al. | 346—32 |
| 2,720,360 | 10/55 | Luhn | 235—61.7 |
| 2,785,388 | 3/57 | McWhirter et al. | 340—149 |
| 2,939,110 | 5/60 | Beattie et al. | 340—149 |
| 2,988,217 | 6/61 | Mayle | 209—72 |
| 3,027,070 | 3/62 | Sallach et al. | 235—61.7 |
| 3,034,643 | 5/62 | Keller et al. | |

IRVING L. SRAGOW, *Primary Examiner.*

STEPHEN W. CAPELLI, EDWARD G. ANDERSON, *Examiners.*